US012460799B2

(12) United States Patent
Dee et al.

(10) Patent No.: US 12,460,799 B2
(45) Date of Patent: Nov. 4, 2025

(54) PORTABLE AREA LIGHT

(71) Applicant: MILWAUKEE ELECTRIC TOOL CORPORATION, Brookfield, WI (US)

(72) Inventors: Sullivan Dee, West Allis, WI (US); Jeffrey L. Spenner, Hubertus, WI (US); Alexis R. Taylor, McFarland, WI (US); Ashton L. Krepelka, Shorewood, WI (US); Matthew J. Johnson, Oconomowoc, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 0 days.

(21) Appl. No.: 18/960,381

(22) Filed: Nov. 26, 2024

(65) Prior Publication Data

US 2025/0180193 A1 Jun. 5, 2025

Related U.S. Application Data

(60) Provisional application No. 63/604,234, filed on Nov. 30, 2023.

(51) Int. Cl.

*F21V 21/06* (2006.01)
*B60P 3/18* (2006.01)
(Continued)

(52) U.S. Cl.

CPC ................ *F21V 21/06* (2013.01); *B60P 3/18* (2013.01); *F16M 11/24* (2013.01); *F21L 4/02* (2013.01); *F21L 4/04* (2013.01); *F21V 21/34* (2013.01); *F21V 23/003* (2013.01); *F21V 21/36* (2013.01); *F21W 2131/1005* (2013.01)

(58) Field of Classification Search

CPC ........ F21V 21/06; F21V 21/22; F21V 17/007; F21L 14/04; F21L 4/04; F21W 2131/1005; F16M 11/24; F16M 11/242; F16M 11/245; F16M 11/247; B60P 3/18
See application file for complete search history.

(56) References Cited

U.S. PATENT DOCUMENTS

| | | | |
|---|---|---|---|
| 3,657,551 A | 4/1972 | Lingert et al. | |
| 4,181,929 A | 1/1980 | Barber et al. | |

(Continued)

FOREIGN PATENT DOCUMENTS

| | | |
|---|---|---|
| CN | 201507792 U | 6/2010 |
| CN | 201611014 U | 10/2010 |

(Continued)

*Primary Examiner* — Alexander K Garlen
(74) *Attorney, Agent, or Firm* — Michael Best & Friedrich LLP

(57) ABSTRACT

An area light includes a base module, a mast assembly extending upward from the base module, a light assembly coupled to the mast assembly and configured to emit light, and a leg assembly coupled to the base module for movement between a stowed position and a deployed position. The leg assembly includes a track coupled to the base module, a leg beam extending between a first beam end and a second beam end, the first beam end being mounted to the track for translation along the track and rotation with respect to the track, and an adjustment mechanism for translating the leg beam with respect to the track after the leg assembly is in the deployed position.

19 Claims, 13 Drawing Sheets

(51) Int. Cl.

| | |
|---|---|
| ***F16M 11/24*** | (2006.01) |
| ***F21L 4/02*** | (2006.01) |
| ***F21L 4/04*** | (2006.01) |
| ***F21V 21/34*** | (2006.01) |
| ***F21V 21/36*** | (2006.01) |
| ***F21V 23/00*** | (2015.01) |
| ***F21W 131/10*** | (2006.01) |

(56) References Cited

U.S. PATENT DOCUMENTS

| | | | | |
|---|---|---|---|---|
| 5,934,628 | A | 8/1999 | Bosnakovic | |
| 6,454,228 | B1 | 9/2002 | Bosnakovic | |
| 6,464,196 | B1 | 10/2002 | Crookham et al. | |
| 6,692,142 | B1 | 2/2004 | Gordin et al. | |
| 7,246,782 | B2 | 7/2007 | Crookham et al. | |
| 7,246,913 | B2 | 7/2007 | Ossolinski | |
| 7,470,036 | B2 | 12/2008 | Deighton et al. | |
| 7,484,858 | B2 | 2/2009 | Deighton et al. | |
| 7,731,398 | B2 | 6/2010 | Probasco | |
| 7,810,964 | B2 | 10/2010 | Probasco | |
| 8,104,934 | B2 | 1/2012 | Probasco | |
| 8,172,438 | B2 | 5/2012 | Konop | |
| 8,235,559 | B2 | 8/2012 | Probasco | |
| 8,328,377 | B1 | 12/2012 | Kothari | |
| D679,336 | S | 4/2013 | White | |
| 8,590,190 | B2 | 11/2013 | White | |
| 8,599,097 | B2 | 12/2013 | Intravatola | |
| 8,939,593 | B2 | 1/2015 | Kothari | |
| 9,163,823 | B2 | 10/2015 | Choksi et al. | |
| 9,305,475 | B1 | 4/2016 | White | |
| 9,791,118 | B2 | 10/2017 | Carpoff | |
| 9,810,408 | B2 | 11/2017 | Fang | |
| 9,816,661 | B2 | 11/2017 | Sharrah et al. | |
| 9,955,553 | B2 | 4/2018 | Fletcher | |
| 10,082,281 | B1 | 9/2018 | Liao | |
| 10,094,544 | B2 | 10/2018 | Fang | |
| 10,215,331 | B2 | 2/2019 | Sharrah et al. | |
| 10,393,324 | B1 | 8/2019 | Chambers | |
| 10,401,006 | B2 | 9/2019 | Kennedy | |
| 10,557,279 | B1 | 2/2020 | Webb et al. | |
| 10,655,777 | B2 | 5/2020 | Sharrah et al. | |
| 10,690,304 | B2 | 6/2020 | Adams et al. | |
| 10,731,812 | B2 | 8/2020 | Nashimoto et al. | |
| 10,851,976 | B2 | 12/2020 | Proeber et al. | |
| 10,871,004 | B2 | 12/2020 | Chambers et al. | |
| 10,907,812 | B1 | 2/2021 | Webb et al. | |
| 11,015,773 | B2 | 5/2021 | Adams et al. | |
| 11,143,389 | B2 | 10/2021 | Proeber et al. | |
| 11,238,145 | B2 | 2/2022 | Bresnahan et al. | |
| 11,365,555 | B2 | 6/2022 | Chambers et al. | |
| 11,415,301 | B2 | 8/2022 | Johnson et al. | |
| 2002/0179788 | A1 | 12/2002 | Crookham et al. | |
| 2008/0006746 | A1 | 1/2008 | Volochine | |
| 2012/0327645 | A1 | 12/2012 | You et al. | |
| 2013/0039049 | A1 | 2/2013 | Jones et al. | |
| 2013/0265780 | A1 | 10/2013 | Choksi et al. | |
| 2013/0322073 | A1 | 12/2013 | Hamm et al. | |
| 2014/0218936 | A1 | 8/2014 | Mahling et al. | |
| 2015/0152998 | A1 | 6/2015 | Intravatola | |
| 2015/0330558 | A1 | 11/2015 | Intravatola | |
| 2016/0161050 | A1* | 6/2016 | Trebesius | F16M 11/38 248/122.1 |
| 2016/0258601 | A1 | 9/2016 | Gowanlock | |
| 2016/0281938 | A1 | 9/2016 | Carpoff | |
| 2016/0298831 | A1* | 10/2016 | Fang | F21V 17/007 |
| 2016/0312967 | A1* | 10/2016 | Harvey | F21V 21/06 |
| 2018/0119935 | A1* | 5/2018 | Proeber | F21S 9/02 |
| 2018/0215404 | A1 | 8/2018 | Hayashi et al. | |
| 2019/0107263 | A1* | 4/2019 | Adams | F21S 6/005 |
| 2019/0346122 | A1* | 11/2019 | Proeber | F21V 17/007 |
| 2019/0360671 | A1* | 11/2019 | Gall | F16M 11/041 |
| 2021/0048180 | A1 | 2/2021 | Proeber et al. | |
| 2021/0270432 | A1 | 9/2021 | Adams et al. | |
| 2021/0396375 | A1 | 12/2021 | Proeber et al. | |
| 2022/0325550 | A1 | 10/2022 | Chambers et al. | |
| 2022/0390094 | A1 | 12/2022 | Johnson et al. | |
| 2023/0296233 | A1* | 9/2023 | Bai | F21V 21/22 362/249.03 |

FOREIGN PATENT DOCUMENTS

| | | | |
|---|---|---|---|
| CN | 102588749 | A | 7/2012 |
| CN | 202302770 | U | 7/2012 |
| CN | 202469508 | U | 10/2012 |
| CN | 203052244 | U | 7/2013 |
| CN | 103363377 | A | 10/2013 |
| CN | 203431683 | U | 2/2014 |
| CN | 203671452 | U | 6/2014 |
| CN | 203868723 | U | 10/2014 |
| CN | 203868724 | U | 10/2014 |
| CN | 104165279 | A | 11/2014 |
| CN | 203927455 | U | 11/2014 |
| CN | 104180187 | A | 12/2014 |
| CN | 104180190 | A | 12/2014 |
| CN | 104214706 | A | 12/2014 |
| CN | 104315365 | A | 1/2015 |
| CN | 104359014 | A | 2/2015 |
| CN | 104421821 | A | 3/2015 |
| CN | 204284966 | U | 4/2015 |
| CN | 104896316 | A | 9/2015 |
| CN | 204629129 | U | 9/2015 |
| CN | 204693299 | U | 10/2015 |
| CN | 204845991 | U | 12/2015 |
| CN | 205014095 | U | 2/2016 |
| CN | 205037116 | U | 2/2016 |
| CN | 105371220 | A | 3/2016 |
| CN | 205191449 | U | 4/2016 |
| CN | 205208423 | U | 5/2016 |
| CN | 205524333 | U | 8/2016 |
| CN | 205579452 | U | 9/2016 |
| CN | 106555947 | A | 4/2017 |
| CN | 107091415 | A | 8/2017 |
| CN | 206572398 | U | 10/2017 |
| CN | 206606223 | U | 11/2017 |
| CN | 206739007 | U | 12/2017 |
| CN | 206817346 | U | 12/2017 |
| CN | 107543107 | A | 1/2018 |
| CN | 207000514 | U | 2/2018 |
| CN | 107883350 | A | 4/2018 |
| CN | 207196303 | U | 4/2018 |
| CN | 207316754 | U | 5/2018 |
| CN | 108180428 | A | 6/2018 |
| CN | 207657860 | U | 7/2018 |
| CN | 207674165 | U | 7/2018 |
| CN | 208154336 | U | 11/2018 |
| CN | 108970061 | A | 12/2018 |
| CN | 208186170 | U | 12/2018 |
| CN | 208204614 | U | 12/2018 |
| CN | 109237383 | A | 1/2019 |
| CN | 208504176 | U | 2/2019 |
| CN | 208595504 | U | 3/2019 |
| CN | 208794274 | U | 4/2019 |
| CN | 208794300 | U | 4/2019 |
| CN | 208832333 | U | 5/2019 |
| CN | 208881825 | U | 5/2019 |
| CN | 208983044 | U | 6/2019 |
| CN | 109973896 | A | 7/2019 |
| CN | 209294848 | U | 8/2019 |
| CN | 110296334 | A | 10/2019 |
| CN | 110296360 | A | 10/2019 |
| CN | 110332473 | A | 10/2019 |
| CN | 209617181 | U | 11/2019 |
| CN | 110588733 | A | 12/2019 |
| CN | 209762767 | U | 12/2019 |
| CN | 110939901 | A | 3/2020 |
| CN | 210141495 | U | 3/2020 |
| CN | 210197049 | U | 3/2020 |
| CN | 111022995 | A | 4/2020 |
| CN | 210241396 | U | 4/2020 |
| CN | 210266790 | U | 4/2020 |
| CN | 210680784 | U | 6/2020 |
| CN | 211011142 | U | 7/2020 |
| CN | 211083926 | U | 7/2020 |

(56) References Cited

FOREIGN PATENT DOCUMENTS

| | | | | | |
|---|---|---|---|---|---|
| CN | 211289873 | U | | 8/2020 | |
| CN | 211738698 | U | | 10/2020 | |
| CN | 211875734 | U | | 11/2020 | |
| CN | 211902433 | U | | 11/2020 | |
| CN | 211925436 | U | | 11/2020 | |
| CN | 211952306 | U | | 11/2020 | |
| CN | 112128639 | A | | 12/2020 | |
| CN | 212132111 | U | | 12/2020 | |
| CN | 212178740 | U | | 12/2020 | |
| CN | 212204315 | U | | 12/2020 | |
| CN | 212273741 | U | | 1/2021 | |
| CN | 112361275 | A | | 2/2021 | |
| CN | 112389511 | A | | 2/2021 | |
| CN | 212456642 | U | | 2/2021 | |
| CN | 212612090 | U | | 2/2021 | |
| CN | 112524537 | A | | 3/2021 | |
| CN | 212766415 | U | | 3/2021 | |
| CN | 212987046 | U | | 4/2021 | |
| CN | 213237025 | U | | 5/2021 | |
| CN | 213534771 | U | | 6/2021 | |
| CN | 213577260 | U | | 6/2021 | |
| CN | 213630184 | U | | 7/2021 | |
| CN | 213746458 | U | | 7/2021 | |
| CN | 213840744 | U | | 7/2021 | |
| CN | 213900908 | U | | 8/2021 | |
| CN | 214064770 | U | | 8/2021 | |
| CN | 214084349 | U | | 8/2021 | |
| CN | 214138646 | U | | 9/2021 | |
| CN | 214198230 | U | | 9/2021 | |
| CN | 214369421 | U | | 10/2021 | |
| CN | 214467976 | U | | 10/2021 | |
| CN | 214586059 | U | | 11/2021 | |
| CN | 214664028 | U | | 11/2021 | |
| CN | 215553293 | U | | 1/2022 | |
| CN | 215764673 | U | | 2/2022 | |
| CN | 215971657 | U | | 3/2022 | |
| CN | 216281074 | U | | 4/2022 | |
| CN | 216526658 | U | | 5/2022 | |
| CN | 216813836 | U | | 6/2022 | |
| CN | 217004116 | U | | 7/2022 | |
| CN | 217030894 | U | | 7/2022 | |
| CN | 217082242 | U | | 7/2022 | |
| CN | 114857512 | A | | 8/2022 | |
| CN | 217302534 | U | | 8/2022 | |
| CN | 115585420 | A | | 1/2023 | |
| DE | 20200634 | U1 | | 5/2002 | |
| DE | 102013005987 | A1 | | 10/2014 | |
| DE | 202020101168 | U1 | | 6/2021 | |
| EP | 3208822 | A1 | | 8/2017 | |
| EP | 3816507 | A1 | | 5/2021 | |
| EP | 4067727 | A1 | * | 10/2022 | ................ F21L 4/04 |
| WO | WO2006047836 | A1 | | 5/2006 | |
| WO | WO2011115418 | A2 | | 9/2011 | |

* cited by examiner

PORTABLE AREA LIGHT

CROSS-REFERENCE TO RELATED APPLICATIONS

The present application claims priority to U.S. Provisional Application No. 63/604,234, filed Nov. 30, 2023, the entire contents of which is incorporated by reference herein.

BACKGROUND

The present invention relates to area lights, and more specifically, to portable area lights.

Mobile light systems, including area lights, are used to illuminate worksites or other areas without permanent lighting fixtures, outdoor spaces, and/or spaces without electricity. These worksites are often at remote locations, requiring the area lights to be transported to and around the worksite. Many portable lights, such as handheld flashlights or small lantern style lights, are easy to carry to the worksites, but do not provide enough light to illuminate the area well enough to provide suitable working conditions. Other larger lights provide sufficient lighting to the worksite but may be cumbersome to transport.

SUMMARY

In some implementations, the disclosure provides an area light including a base module, a mast assembly extending upward from the base module, a light assembly coupled to the mast assembly and configured to emit light, and a leg assembly coupled to the base module for movement between a stowed position and a deployed position. The leg assembly includes a track coupled to the base module, a leg beam extending between a first beam end and a second beam end, the first beam end being mounted to the track for translation along the track and rotation with respect to the track, and an adjustment mechanism for translating the leg beam with respect to the track after the leg assembly is in the deployed position.

In some implementations, the disclosure provides an area light including a base module, a mast assembly extending upward from the base module, a light assembly coupled to the mast assembly and configured to emit light, and a leg assembly coupled to the base module and moveable between a retracted state and a deployed state. The leg assembly includes a track coupled to the base module, a leg beam extending between a first beam end and a second beam end, a strut extending between a first strut end and a second strut end, a first sled slidably mounted between the leg beam and the track to slide along the track within a first range, and a second sled is slidably mounted between the strut and the track to slide along the track within a second range. The first beam end is adjacent the track, and the second beam end is configured to engage a ground surface. The first strut end is adjacent the track, and the second strut end is pivotally coupled to the leg beam.

In some implementations, the disclosure provides an area light including a base module having a set of wheels supporting the base module on a surface, a battery receptacle disposed in the base module, the battery receptacle configured to receive a battery, a drive motor supported by the base module and electrically coupled to the battery receptacle, a mast assembly extending from the base module, and light assembly coupled to the mast assembly and electrically coupled to the battery receptacle. The drive motor is configured to receive power from the battery and rotate at least some of the set of wheels. The light assembly is configured to receive power from the battery.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
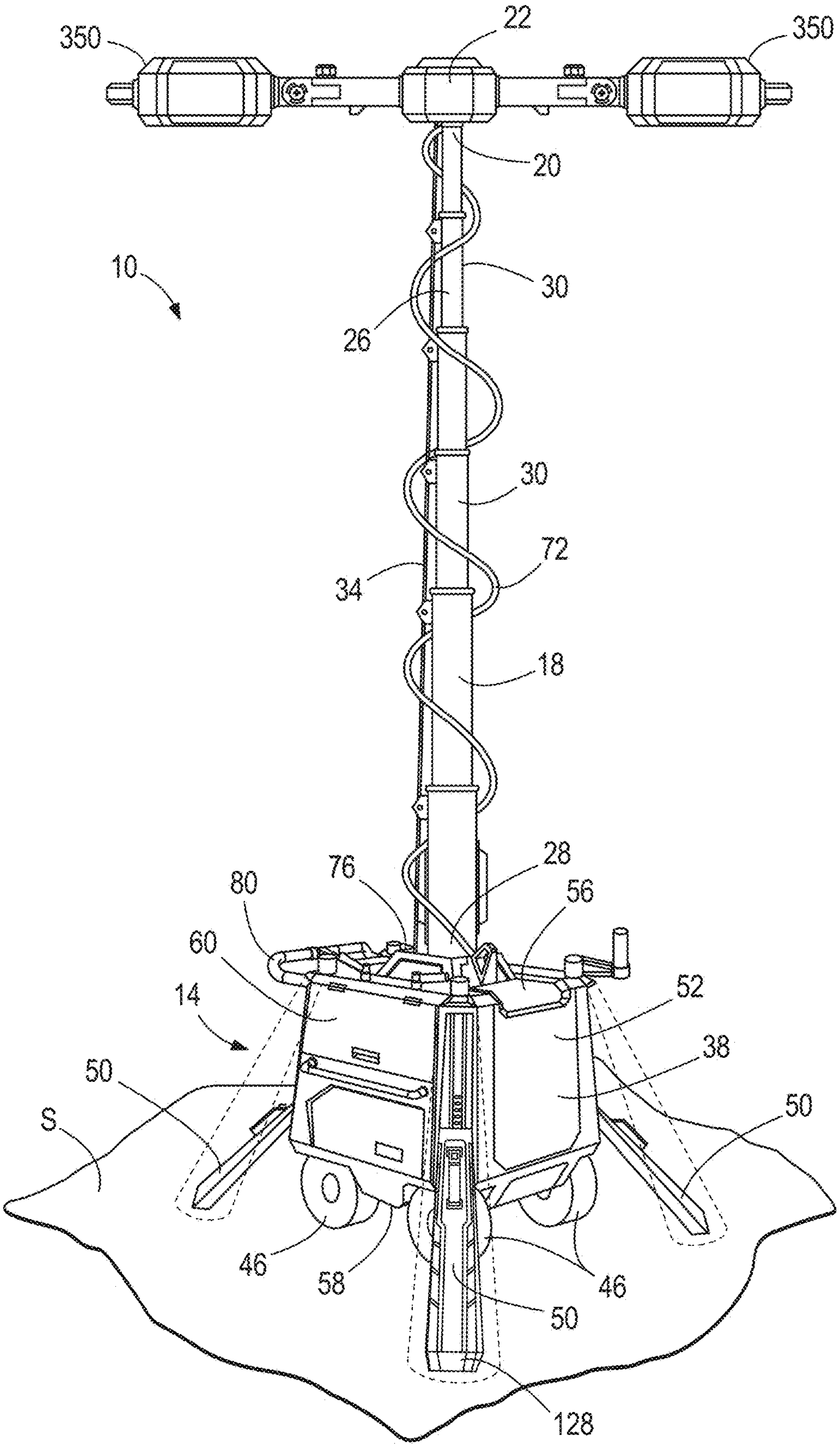
FIG. 1 is a perspective view of an area light in an open configuration, the area light having a mast, a base module with support legs, and a light assembly.
Figure 2:
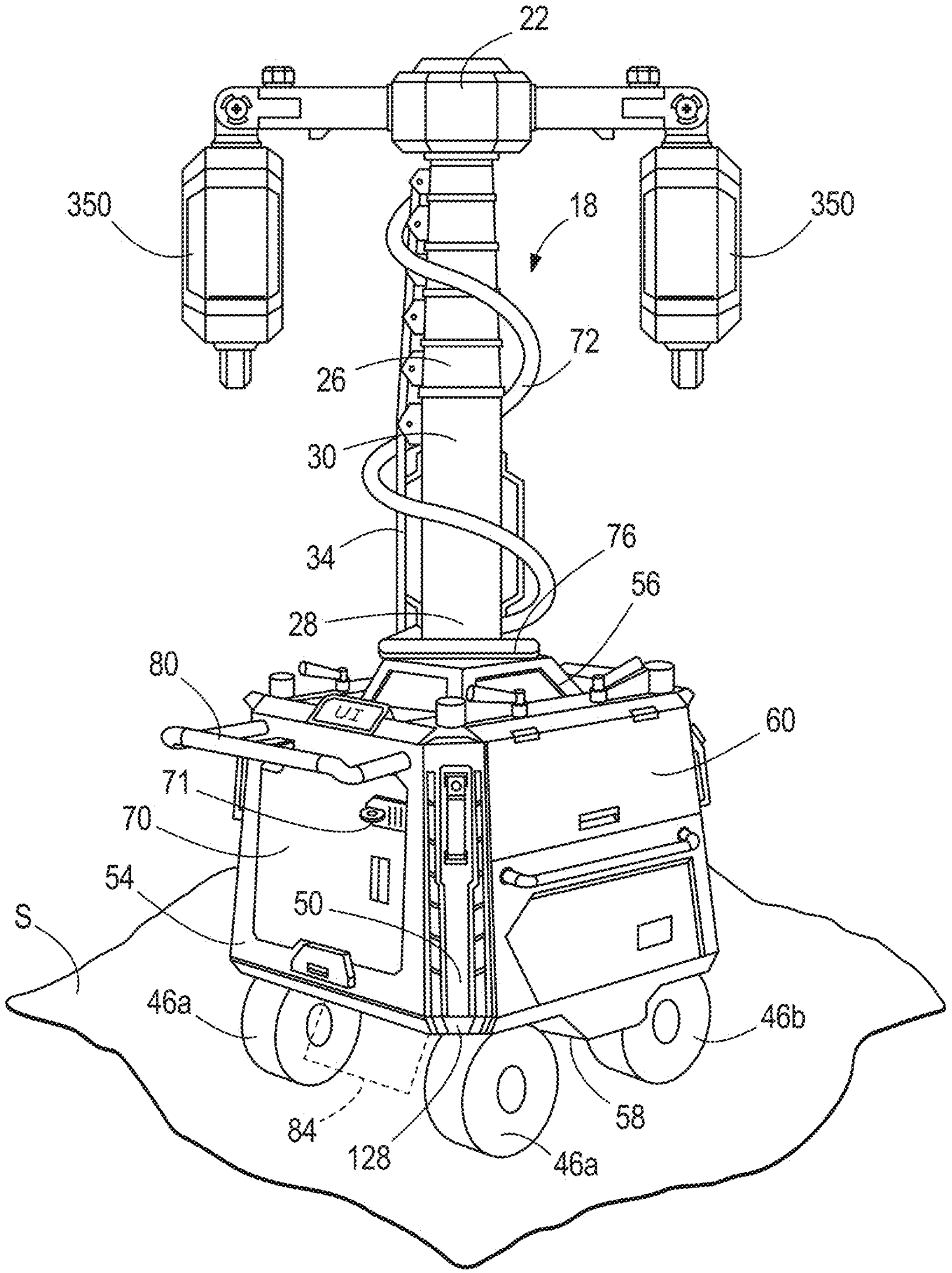
FIG. 2 is a perspective view of the light of FIG. 1 in a storage configuration with the mast collapsed.
Figure 3:
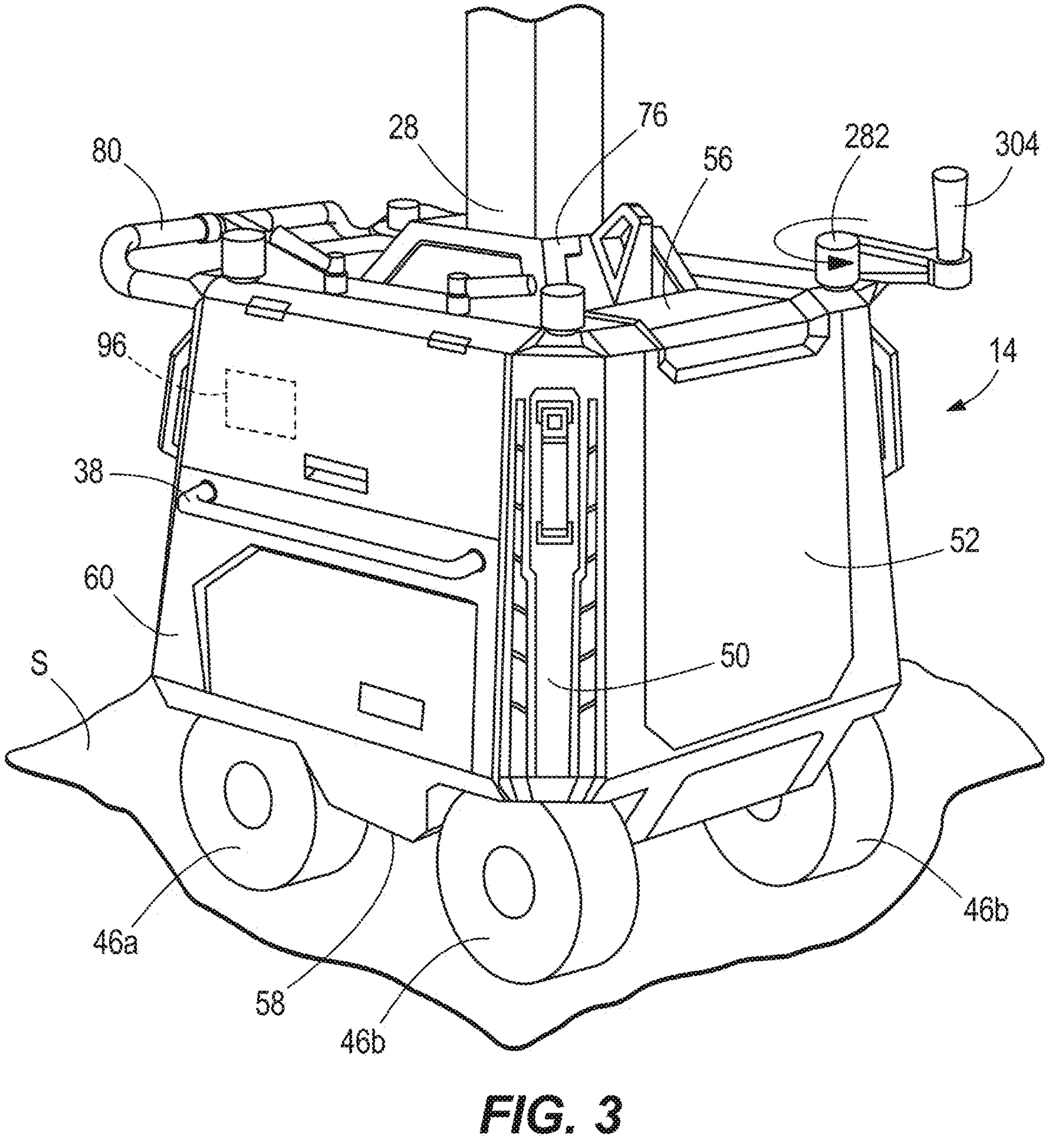
FIG. 3 is a perspective view of the base module of the light of FIG. 1.

FIGS. 1-13 illustrate an area light 10 also referred to herein as a work light, a site light, or a stand light. The area light 10 may be used to illuminate a worksite or other type of area surrounding the area light 10. The illustrated area light 10 includes a base module 14 supported on a ground surface S, a mast assembly 18 extending upward from the base module 14 to a distal end 20, and a light assembly 22 coupled to the distal end 20 of the mast assembly 18. The area light 10 is movable between an open configuration, as shown in FIG. 1, and a storage configuration, as shown in FIG. 2. The open configuration may also be referred to as a use configuration. The storage configuration may also be referred to as a closed configuration or transport configuration.

With reference to FIGS. 1 and 2, the mast assembly 18 includes a collapsible mast 26 extending between a base 28 and the distal end 20. The base 28 of the mast 26 is coupled to the base module 14. In the illustrated embodiment, the collapsible mast 26 includes a plurality of telescoping poles 30 which are capable of nesting within each other to adjust the height, or length, of the mast 26. The mast 26 is movable between a collapsed position (FIG. 2) and a fully extended position (FIG. 1). In the storage configuration of the area light 10, the mast 26 is moved to the collapsed position. In the open configuration of the area light 10, the mast 26 may be expanded to any position between the collapsed position and the fully extended position to adjust the height (i.e., the distance between the distal end 20 and the ground surface S). The mast assembly 18 further includes a mast drive mechanism 34. In the illustrated embodiment, the mast drive mechanism 34 includes a motorized winch and cable system. In other embodiments, other types of drive mechanisms may be used to adjust the height of the mast 26 (e.g., pulleys, belts, wires, linear actuators, hydraulic actuators, etc.). In some embodiments, the mast drive mechanism 34 may partially or fully include manual adjustment of the poles by an operator of the area light 10. In still further embodiments, the collapsible mast 26 may utilize other methods of height variation in place of the telescoping poles 30.

With reference to FIGS. 1-4, the base module 14 includes a housing 38, a power source 42 positioned in the housing 38, wheels 46 coupled to the housing 38, and leg assemblies 50 retractably coupled to the housing 38. In the illustrated embodiment, the housing 38 is generally cuboid and includes a front wall 52, a rear wall 54, an upper wall 56, a bottom wall 58, and a pair of side walls 60. In other embodiments, the housing 38 may be differently shaped. While the nomenclature and directions described herein reference a specific direction of movement of the area light 10 during normal use, the directional language is not intended to limit the direction or the functions of the area light 10 and can be adjusted as needed.

Figure 4:
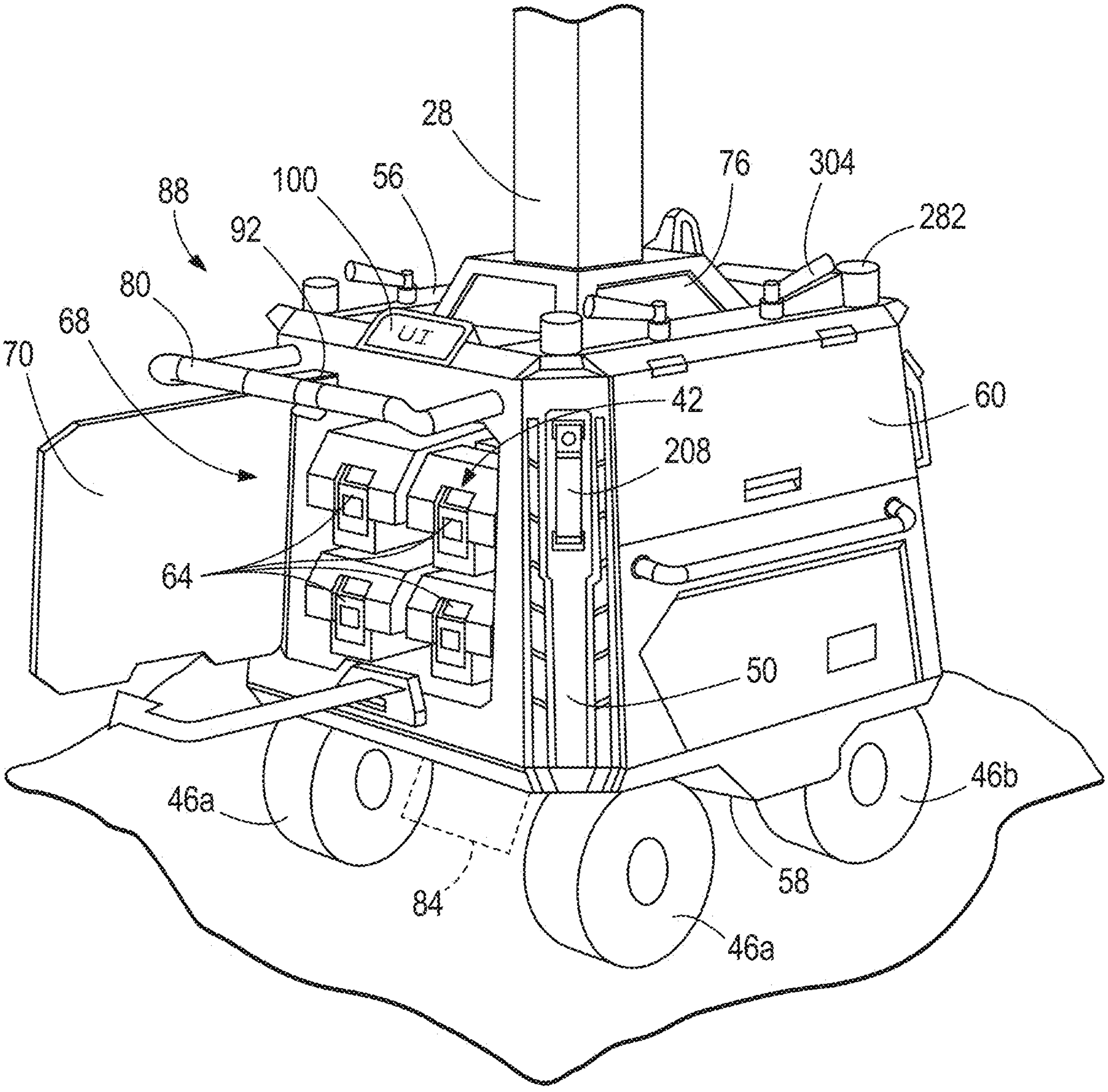
FIG. 4 is another perspective view of the base module of the light of FIG. 1 with a compartment door open.

As seen in FIG. 4, the area light 10 is battery powered and the power source 42 includes one or more batteries 64. The housing 38 includes a battery receptacle 68 for receiving the batteries 64 and electrically coupling the batteries 64 to an internal electronic system of the base module 14. In the illustrated embodiment, the battery receptacle 68 is accessible through the rear wall 54 and is enclosable by a battery door 70 hingedly coupled to the rear wall 54. In other embodiments, the battery receptacle 68 may be accessible through any other wall of the housing 38 (e.g., the front wall 52). As seen best in FIG. 2, the battery door 70 includes a padlock hook 71 allowing a user to inhibit unauthorized access to the battery receptacle 68.

With continued reference to FIG. 4, in the illustrated embodiment, the area light 10 includes four of the batteries 64. In some embodiments, the power source 42 may include less than four of the batteries and as few as one battery 64. In some embodiments, the power source 42 may include more than four of the batteries 64. In yet other embodiments, the power source 42 may not be a battery 64 and may instead be an AC power source. In other embodiments, the area light 10 may be powered by a combination of batteries 64 and an AC power source. In such embodiments, the area light 10 may also include one or more chargers to charge the batteries 64 using the AC power source. In the illustrated embodiment, each of the four batteries 64 is a removable and rechargeable battery pack, such as a 72V lithium-ion power tool battery pack. In some embodiments, the power source 42 may include batteries 64 of different sizes (e.g., voltage, capacity, etc.) or different materials (lithium, alkaline, etc.). In some embodiments, the power source 42 may include a combination of removable batteries 64 and onboard or integrated rechargeable batteries 64. The power source 42 is electrically coupled to the internal electronic system of the base module 14 to provide power to the electrical components including the mast drive mechanism 34. The power source 42 also provides power to the light assembly 22. In the illustrated embodiment, the light assembly 22 is electrically connected to the power source 42 by a retractable cable 72 coupled to the light assembly 22 and the base module 14. As seen in FIGS. 1 and 2, the cable 72 is wound around the mast assembly 18. The cable may be of a length sufficient to extend with the mast assembly 18 to the fully extended position. The excess length of the cable 72 is coiled around the base 28 of the collapsible mast 26 in a cable recess 76 formed on the upper wall 56 of the housing 38. In some embodiments, the cable 72 may be otherwise positioned, or power may be transmitted through electrical connections positioned within the mast 26.

With reference to FIGS. 1-4, the area light 10 is easy to transport to a worksite to be positioned to illuminate the work site, often traversing rough terrain. A handle 80 extends from the rear wall 54 and is gripped and pushed by an operator to move the base module 14 and roll the wheels 46 across the ground. The wheels 46 are coupled to the bottom wall 58 of the housing 38 and support the area light 10 on the ground surface S. In some embodiments, the wheels 46 and the handle 80 may be coupled with an internal portion of a frame structure of the base module 14. In the illustrated embodiment, the wheels 46 include a pair of drive wheels **46*a* and a pair of caster wheels 46*b*. The pair of caster wheels 46*b* are coupled to the bottom wall 58 adjacent the front wall 52 and are each coupled to swivel about a vertical axis as well as rotate about a horizontal axis to roll across the ground surface S. The pair of drive wheels 46*a* are coupled to the bottom wall 58 adjacent the rear wall 54 and may include tires or other surfacing to increase the friction between the drive wheels 46*a* and the ground surface S, allowing the drive wheels 46*a* to better propel the area light 10 forward. The drive wheels 46*a* may also be motorized, while the caster wheels 46*b* may be non-motorized or non-powered wheels. The area light 10 is a cart style light and the caster wheels 46*b* and the drive wheels 46*a*** offer good maneuverability in tight spaces (for example, getting on and off a truck or trailer) and ease of transport or movement across uneven or rocky ground surface S. In other embodiments, all of the wheels may be drive wheels or all of the wheels may be caster wheels (or other non-powered wheels).

With reference to FIG. 4, the area light 10 is a powered cart and the pair of drive wheels **46*a* are coupled to a drive motor 84 that is operable to rotate the drive wheels 46*a*. The drive motor 84 may be selectively operated through a user interface 88 to power the drive wheels 46*a* and assist with moving the area light 10 across the ground. In some embodiments, the area light 10 may include two drive motors and each drive wheel 46*a* may be coupled to a separate motor. The user interface 88 includes a panel 100 on the base module 14. The panel 100 may include buttons, switches, touch-screens, displays, or other controls and indicators. In some embodiments, the user interface 88 may include additional controls positioned elsewhere on the base module 14** and all coupled via the internal electronics system of the base module 14. The user interface 88 is coupled to a controller 96 that selectively activates the electronic components, such as the mast drive mechanism 34 and the drive motor 84, according to operator input from the user interface 88. The user interface 88 may also provide information about the batteries 64, the light assembly 22, and/or other parts of the area light 10.

With continued reference to FIG. 4, in the illustrated embodiment, the drive motor 84 is actuated in response to a trigger 92 of the user interface 88. The illustrated trigger 92 is positioned on the handle 80. The trigger 92 may be a lever that pivots toward and away from the handle 80 or an actuator that rotates about the handle 80. The trigger 92 is coupled to the controller 96 and generates a signal when the trigger 92 is actuated. The controller 96 connects the drive motor 84 to the power source 42 and operates the motor 84 in response to the signal from the trigger 92. The trigger 92 may be similar to the control trigger typically found on the handles of lawnmowers. For example, the trigger 92 may be held continuously for power to be provided to the drive motor 84. In some embodiments, the drive motor 84 is controlled through other parts of the user interface 88. In some embodiments, the controller 96 may be programmed to activate the drive motor 84 automatically, for example, in response to movement of the cart as detected by an accelerometer or other sensor. The controller 96 may activate the drive motor 84 to rotate the drive wheels 46*a* in both a forward direction and a reverse direction. In some embodiments, a speed of the drive motor 84 may be limited when operating in the reverse direction compared to the forward direction.

With reference to FIG. 1, the base module 14 is supported on the ground by the wheels 46 in the closed configuration, and additionally by the leg assemblies 50 (also referred to herein as a set of supports) in the open configuration. That is, the base module 14 is only supported by the wheels 46 when the area light 10 is in the closed configuration, but is supported by both the ground wheels 46 and the leg assemblies when the area light 10 is in the open configuration. In the illustrated embodiment, the area light 10 include four leg assemblies 50. Each leg assembly 50 is coupled to a corner edge of the housing 38, and the leg assemblies 50 are thus spaced apart by the width of the housing 38. In some embodiments, the four leg assemblies 50 may be coupled with the frame structure of the base module 14. In some embodiments, the area light 10 may include three leg assemblies 50 or may include more than four leg assemblies 50. In some embodiments, the leg assemblies 50 are coupled to other portions of the base module 14. In the illustrated embodiment, the leg assemblies 50 are movable between a retracted state (FIG. 2) and a deployed state (FIG. 1). In the storage configuration of the area light 10, the leg assemblies 50 are in the retracted state, and in the open configuration of the area light 10, the leg assemblies 50 are in the deployed state. The leg assemblies 50 are configured to contact the ground surface S in the deployed state to create a wider base and stabilize the area light 10 in the open configuration. In the illustrated embodiment, each of the four leg assemblies 50 is identical to each other. In some embodiments, one or more of the leg assemblies 50 may be used in conjunction with another type of support or leg.

Figure 5:
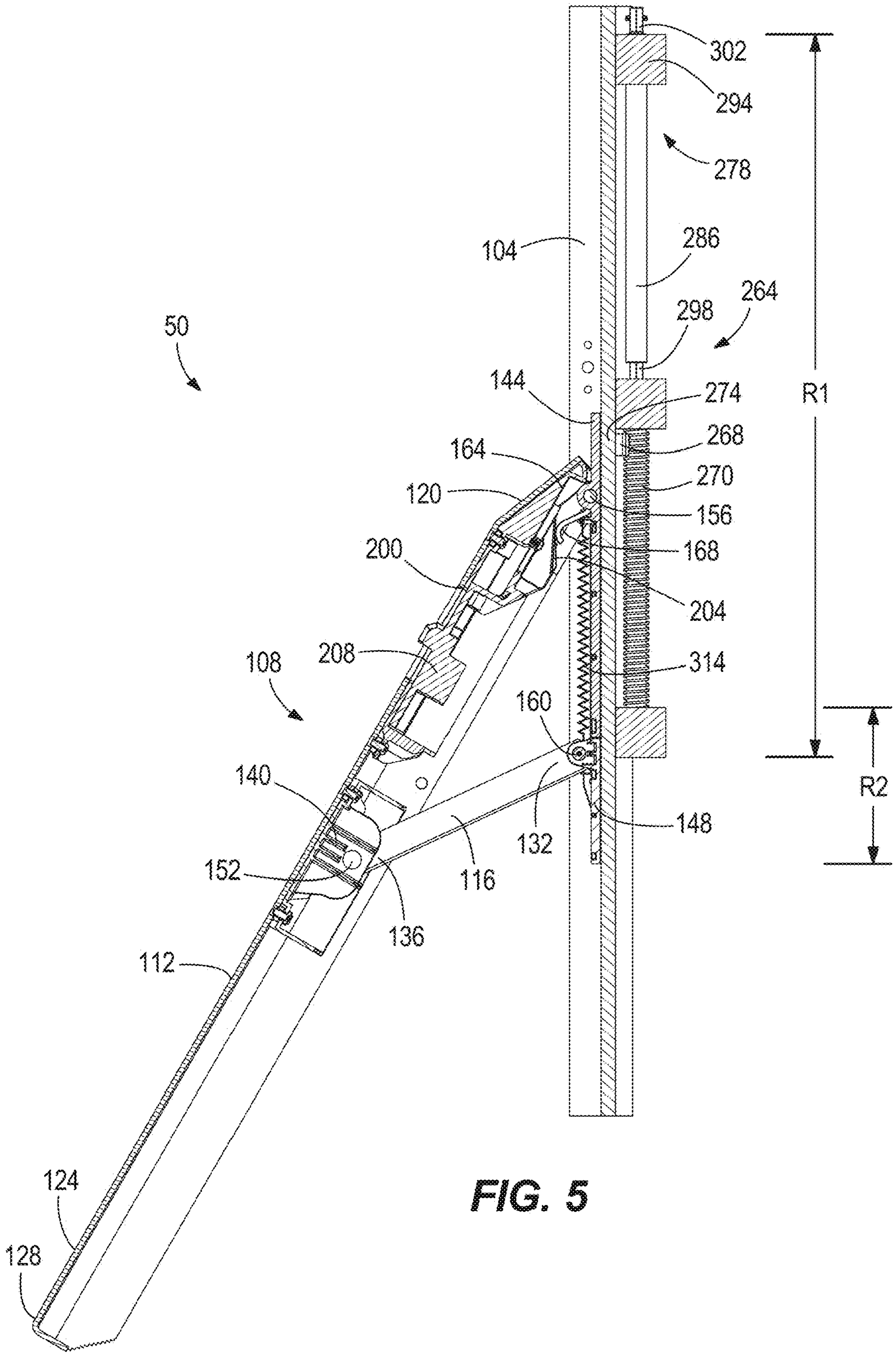
FIG. 5 is a cross-sectional view of one of the support legs of FIG. 1 in a deployed state.
Figure 6:
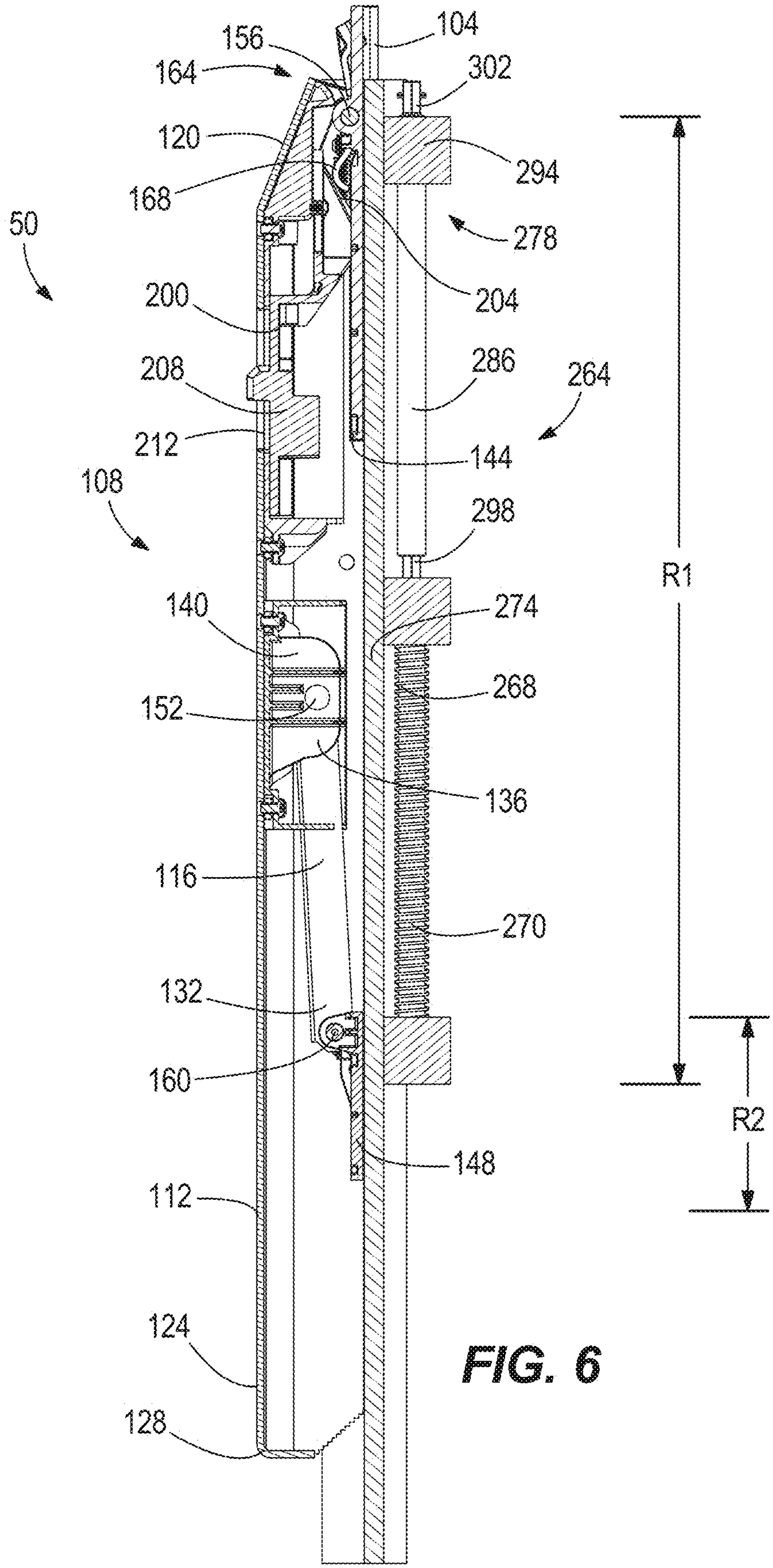
FIG. 6 is a cross-sectional view of the support leg of FIG. 5 in a stowed state.

With reference to FIGS. 5 and 6, one of the leg assemblies 50 is described in more detail. The leg assembly 50 includes a track 104 coupled to the base module 14 and a leg 108 rotatably and slidably mounted to the track 104. In some embodiments, the track 104 may be coupled to the housing 38 of the base module 14. In particular, the track 104 may be non-movably fixed to the housing 38. For example, the track 104 may be coupled to the frame structure of the base module 14. In some embodiments, the track 104 may be part of the frame structure of the base module 14. The leg 108 includes a leg beam 112 and a strut 116. The leg beam 112 extends between a first beam end 120, coupled to the track 104, and a second beam end 124, including a foot 128 configured to engage the ground surface S. The strut 116 extends between a first strut end 132, coupled to the track 104, and a second strut end 136, pivotally coupled to the leg beam 112 at a mounting point 140 between the first beam end 120 and the second beam end 124. The leg 108 further includes a first sled 144 mounted between the leg beam 112 and the track 104 to slide along the track 104 within a first range R1, and a second sled 148 slidably mounted between the strut 116 and the track 104 to slide along the track 104 within a second range R2. The first beam end 120 of the leg beam 112 is pivotally coupled to the first sled 144. The first strut end 132 of the strut 116 is pivotally coupled to the second sled 148. As seen in FIG. 5, in the deployed state, the leg beam 112 extends at an angle to the track 104. In particular, the leg beam 112 extends at an oblique angle to the track 104. As seen in FIG. 6, in the stowed state the leg beam 112 extends parallel to the track 104.

Figure 7A:
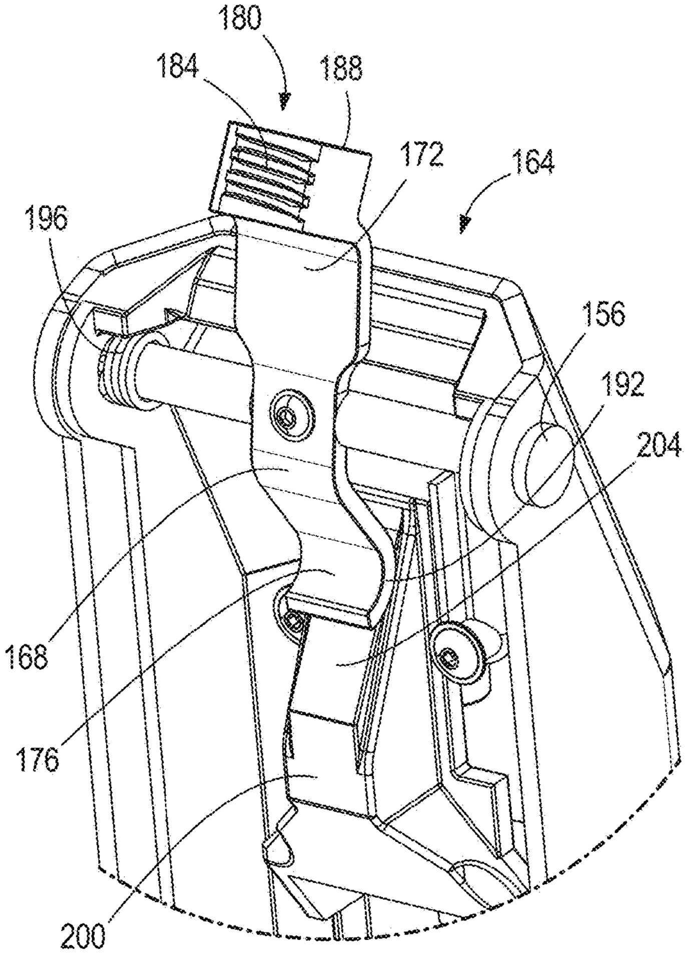
FIG. 7A is a detail view of a portion of the support leg taken from the indicated area of FIG. 7.
Figure 7:
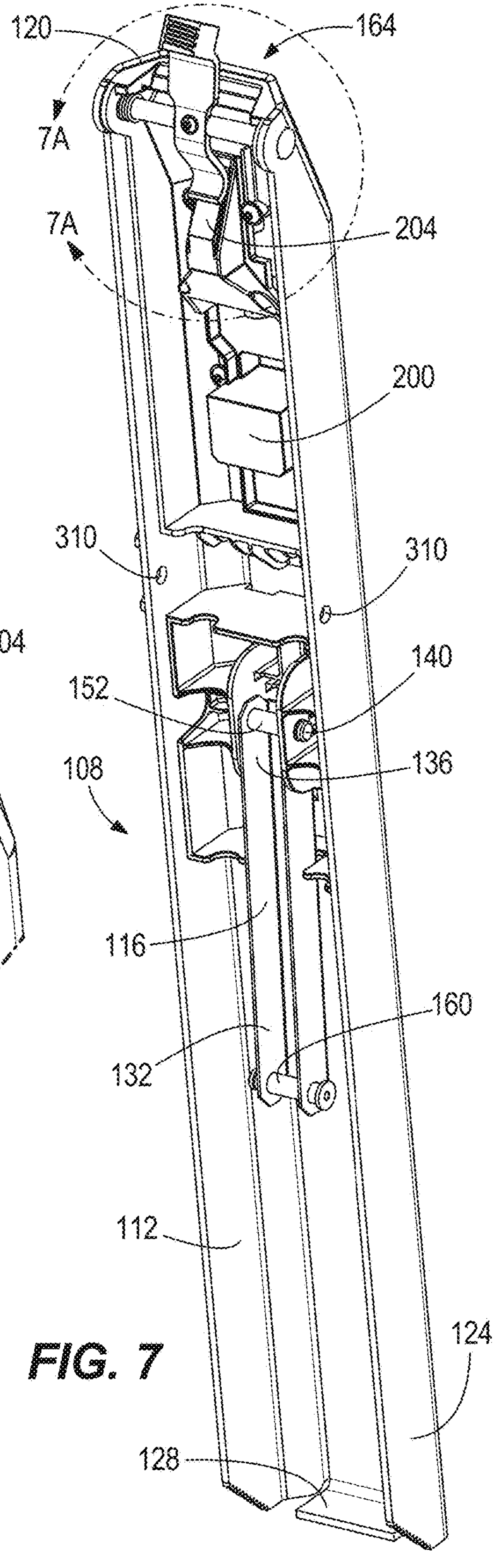
FIG. 7 is a rear view of portions of the support leg of FIG. 5.
Figure 8A:
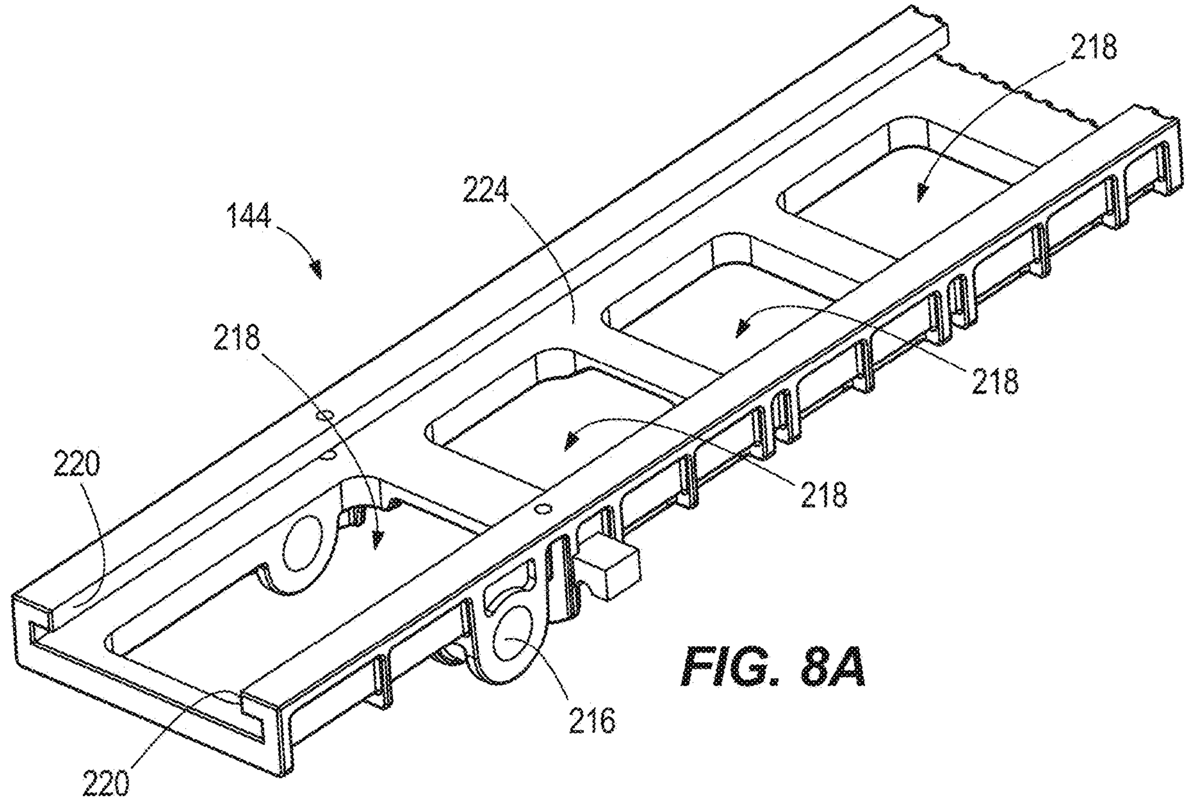
FIG. 8A is a perspective view of a first sled of the support leg of FIG. 5.
Figure 8B:
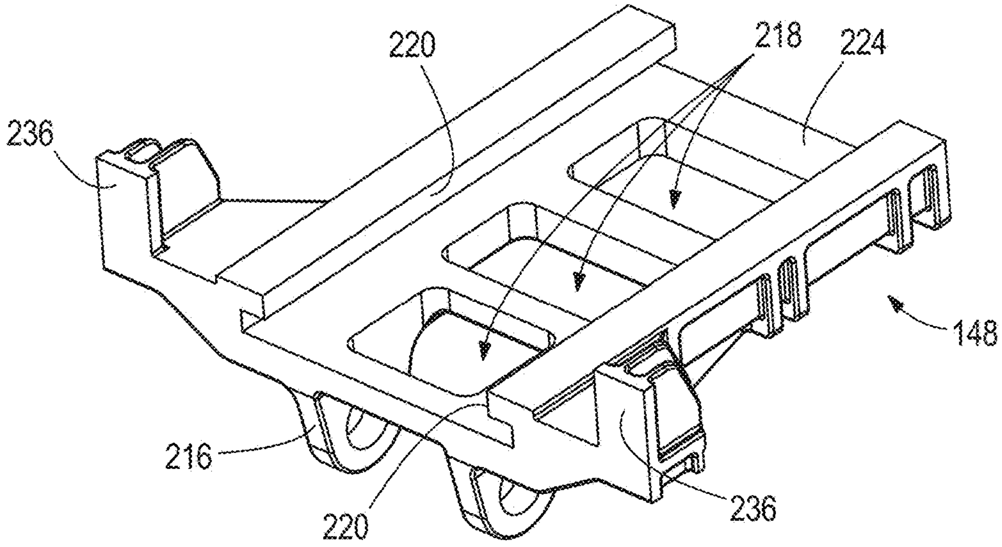
FIG. 8B is a perspective view of a second sled of the support leg of FIG. 5.

With reference to FIG. 7, the illustrated leg beam 112 includes a steel frame and plastic molded components coupled to the steel frame using fasteners such as screws. In other embodiments, the leg beam 112 may have other constructions and other materials with sufficient strength to stabilize the area light 10 (e.g., aluminum). In the illustrated embodiment, the foot 128 is formed in the steel frame of the leg beam 112. In other embodiments, the leg beam 112 may include an additional component coupled to the second beam end 124. The foot 128 may include textured surfaces or other gripping features to increase the friction between the foot 128 and the ground surface S. The mounting point 140 for the strut 116 is positioned between the first and second beam ends 120, 124. In some embodiments, the mounting point 140 may be centered on the leg beam 112. In some embodiments, the mounting point 140 may be closer to the first beam end 120.

With continued reference to FIG. 7, in the illustrated embodiment, the strut 116 is pivotally coupled to the leg beam 112 by a first pin 152 extending through aligned openings on the leg beam 112 and the strut 116. The first pin 152 couples the strut 116 to the leg beam 112 for rotation about an axis perpendicular to the leg beam 112. The first beam end 120 of the leg beam 112 is pivotally mounted to the first sled 144 (FIG. 6) by a second pin 156 for rotation about an axis perpendicular to a length (or longitudinal axis) of the leg beam 112. The second pin 156 extends through aligned openings in the leg beam 112 and the first sled 144. The second strut end 136 of the strut 116 is similarly coupled to the second sled 148 (FIG. 6) by a third pin 160 for rotation about an axis perpendicular to a length (or longitudinal axis) of the track 104 and leg beam 112. The third pin 160 extends through aligned openings in the strut 116 and the second sled 148.

With reference to FIG. 7A, the leg 108 of the leg assembly 50 further includes a latching assembly 164 configured to retain the leg assembly 50 in the deployed state. The latching assembly 164 includes a lever arm 168 pivotally mounted to the leg beam 112. In the illustrated embodiment, the lever arm 168 is fixed for rotation with the second pin 156 that couples the leg beam 112 to the first sled 144 mounted in the track 104. In some embodiments, the lever arm 168 may be mounted to the leg beam 112 for rotation independent of the second pin 156. In some embodiments, the lever arm 168 may be mounted to rotate with respect to the second pin 156 about the rotation axis of the second pin 156. The lever arm 168 has a front end 172 on one side of the second pin 156 and a rear end 176 on the opposite side of the second pin 156. The front end 172 includes an engaging feature 180 having a ribbed surface 184 and an upper surface 188. In the illustrated embodiment, the ribbed surface 184 is concave and threaded including inner threads. The rear end 176 of the lever arm 168 includes a lever cam surface 192. A biasing member 196 biases the lever arm 168 to rotate the front end 172 away from the leg beam 112 (e.g., counter-clockwise in FIG. 7A) so that the engaging feature 180 can engage the track 104 to retain the leg assembly 50 in the deployed state. In the illustrated embodiment, the biasing member 196 is a torsion spring mounted between the second pin 156 and the leg beam 112 to bias the second pin 156 to rotate counter-clockwise (as viewed in FIG. 7A) with respect to the leg beam 112. In some embodiments, the biasing member 196 may instead be mounted to directly engage the lever arm 168 to bias the lever arm 168 and the second pin 156 to rotate, or may directly engage the lever arm 168 to rotate the lever arm 168 with respect to the second pin 156.

With continued reference to FIGS. 7 and 7A, the latching assembly 164 includes a release actuator 200 coupled to the leg beam 112 and operable to pivot the lever arm 168. The release actuator 200 includes a release cam surface 204 and a handle 208 accessible through an opening 212 in the leg beam 112 (FIG. 6). The release actuator 200 is slidably coupled to the leg beam 112 to translate along the leg beam 112. The release actuator 200 is biased toward the second beam end 124 of the leg beam 112. The release actuator 200 is translatable along the leg beam 112 toward the first beam end 120 to an upper position, in which the release cam surface 204 engages the lever cam surface 192 of the lever arm 168.

With reference to FIGS. 8A-9B, the first and second sleds 144, 148 are shown in more detail. Each sled 144, 148 includes a pivot point 216 including aligned openings configured to receive the corresponding pin. The sleds 144, 148 each include windows 218 extending through a rear surface 224 of the sled 144, 148. On the first sled 144, the aligned openings of the pivot point 216 are positioned adjacent to, and on opposite sides of, one of the windows 218.

With reference to FIGS. 8A-10, each sled 144, 148 includes sled rails 220 on the rear surface 224. The sled rails 220 ride along corresponding track rails 228 on an inner surface 232 of the track 104, as seen in FIGS. 9A and 9B. In the illustrated embodiment, the sled rails 220 project inward and the track rails 228 project outward such that the sleds 144, 148 surround the track rails 228. In other embodiments, the sled rails 220 may project outward and be surrounded by the track rails 228. The second sled 148 includes stop projections 236 extending into grooves 240 on either side of the track rails 228. Looking at FIG. 10, the second range R2 may be defined by the span of the grooves 240 along the track 104. In the illustrated embodiment, the span of the grooves 240 is defined by stops 244 (FIG. 10) positioned in the grooves 240 that contact the stop projections 236. The second sled 148 is inhibited from traveling further along the track 104 by the stops 244 and is contained within the second range R2. In some embodiments, the first sled 144 similarly includes stop projections 236 and the first range R1 is defined by additional or overlapping stops inhibiting movement of the first sled 144 outside of the first range R1.

Figure 10:
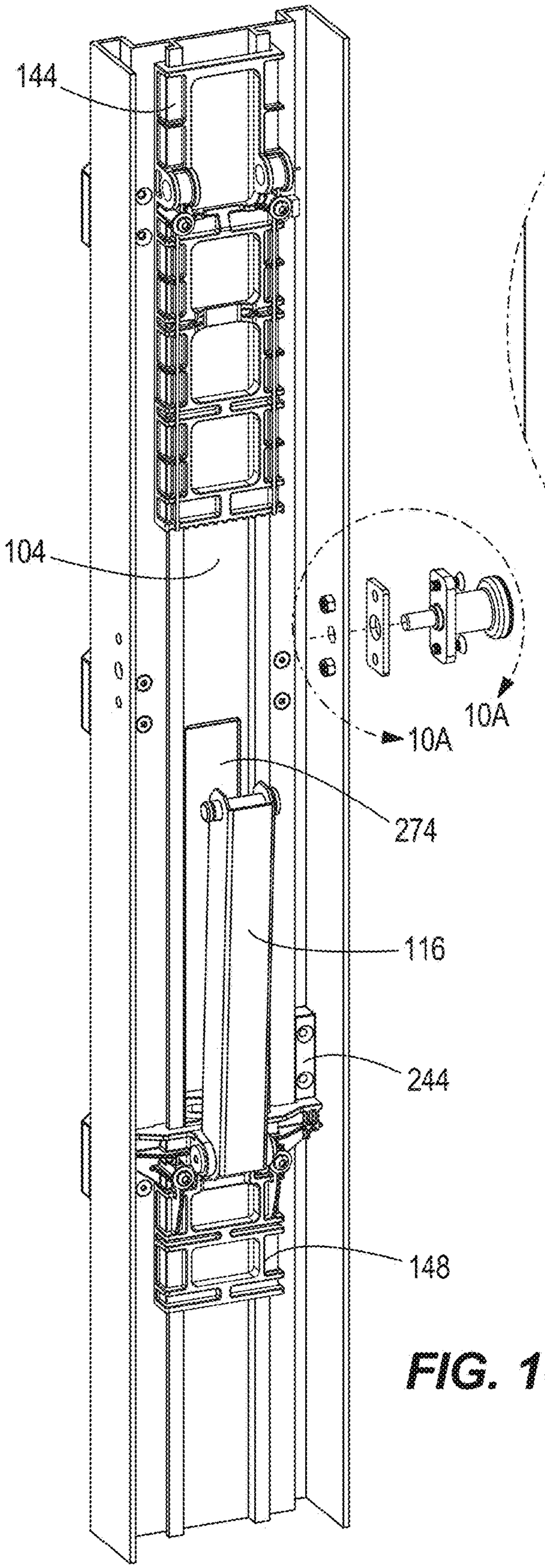
FIG. 10 is a perspective view of the track of the support leg of FIG. 5 including a lock assembly.
Figure 10A:
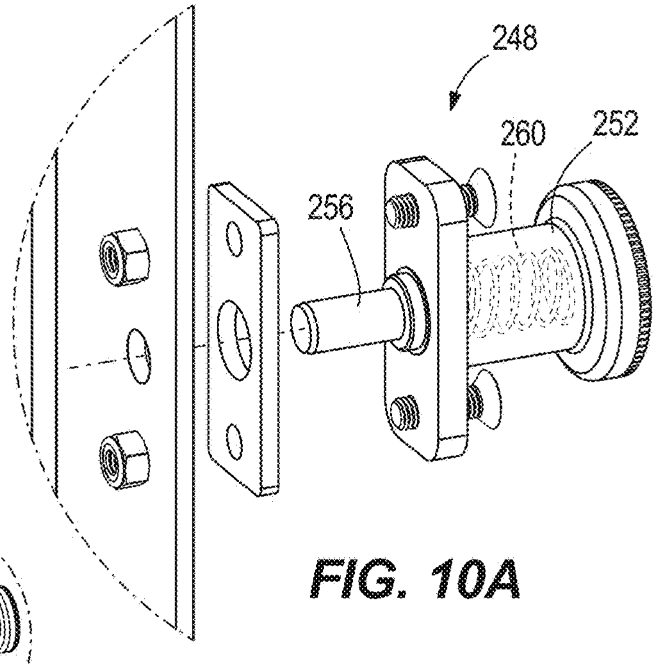
FIG. 10A is a detail view of a portion of the support leg taken from the indicated area of FIG. 10.

With reference to FIGS. 10 and 10A, the leg assembly 50 includes a locking assembly 248 coupled to a side of the track 104. The locking assembly 248 retains the leg assembly 50 in the stowed state until actuated by the operator. The illustrated locking assembly 248 incudes a knob 252 positioned on an outer side of the track 104 and a pin 256 slidably mounted to the track 104 to extend into an inner side of the track 104 and selectively engage the leg assembly 50. The knob 252 is fixed to the pin 256 to translate together, perpendicular to the track 104. The knob 252 is graspable by the operator to pull the knob 252 away from the track 104 and translate the pin 256. The locking assembly 248 further includes a biasing member 260 configured to bias the pin 256 into the interior side of the track 104. The biasing member 260 may be, for example, a coil spring.

With reference back to FIGS. 5 and 6, the leg assembly 50 includes an adjustment mechanism 264 which allows for adjusting the leg 108 with respect to the track 104 when the leg assembly 50 is in the deployed state. The adjustment mechanism 264 includes a ribbed surface 268 coupled to a rear of the track 104 adjacent a window 274 (FIG. 10) formed in the track 104 between the track rails 228. In the illustrated embodiment, the ribbed surface 268 is part of a threaded rod 270 extending parallel to the track 104. The adjustment mechanism 264 includes an actuator 278 that rotates the threaded rod 270 relative to the track 104. The threaded rod 270 may also be considered part of the track 104. In the illustrated embodiment, the actuator 278 includes a crank handle 282 (FIG. 3) and an extension driver 286. The extension driver 286 extends along the length of the track 104 between an upper end 294 and a lower end 298. The lower end 298 is coupled to the threaded rod 270 for corotation therewith. In some embodiments, the lower end 298 may be coupled to the threaded rod 270 through a hexagonal socket interface. In some embodiments, other rotation transmitting coupling methods may be used. A post 302 extends from the upper end 294 of the extension driver 286 and includes a non-circular profile. The crank handle 282 (FIG. 3) may be removably coupled to the extension driver 286 to rotate the extension driver 286 and thereby rotate the threaded rod 270. In the illustrated embodiment, the crank handle 282 may include a socket having a non-circular profile corresponding to the profile of the post 302. In other embodiments, other methods of removably and rotatably coupling the crank handle 282 and the extension driver 286 may be used. In some embodiments, the crank handle 282 may be fixed to the post 302 to rotatably couple the crank handle 282 and the extension driver 286. The crank handle 282 may include a foldable knob 304 (FIG. 1) configured to fold away in the closed configuration of the area light to decrease the footprint of the area light 10.

Figure 9A:
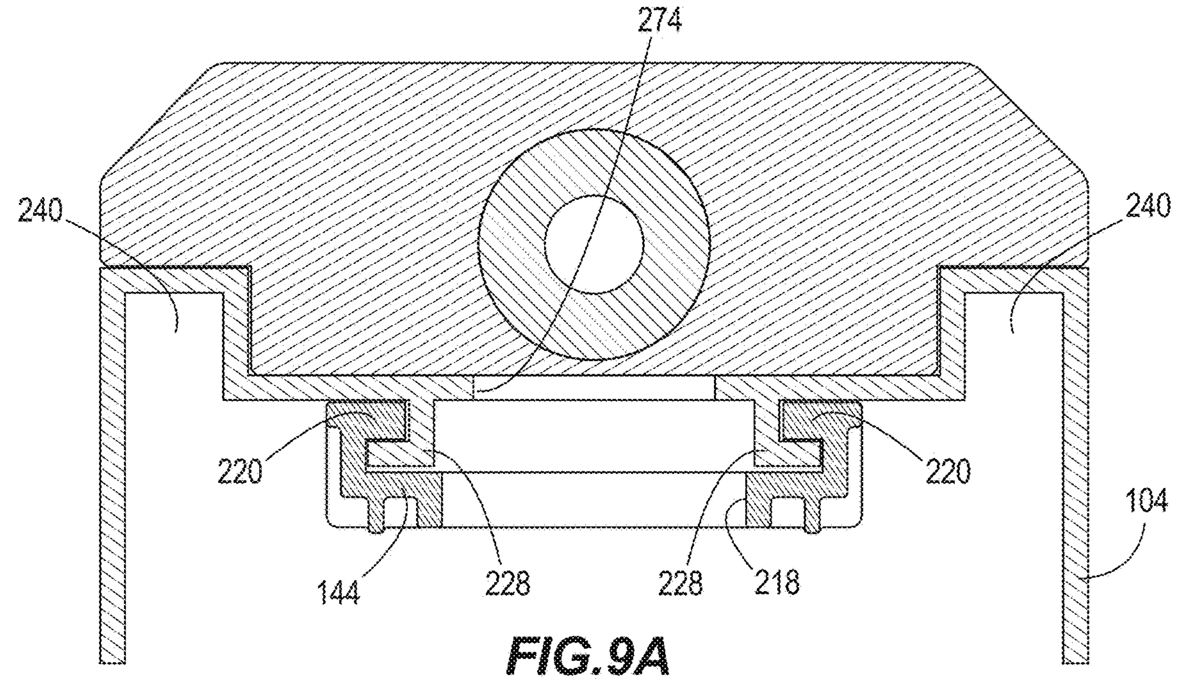
FIG. 9A is a cross-sectional view of the first sled assembled on a track of the support leg of FIG. 5.
Figure 9B:
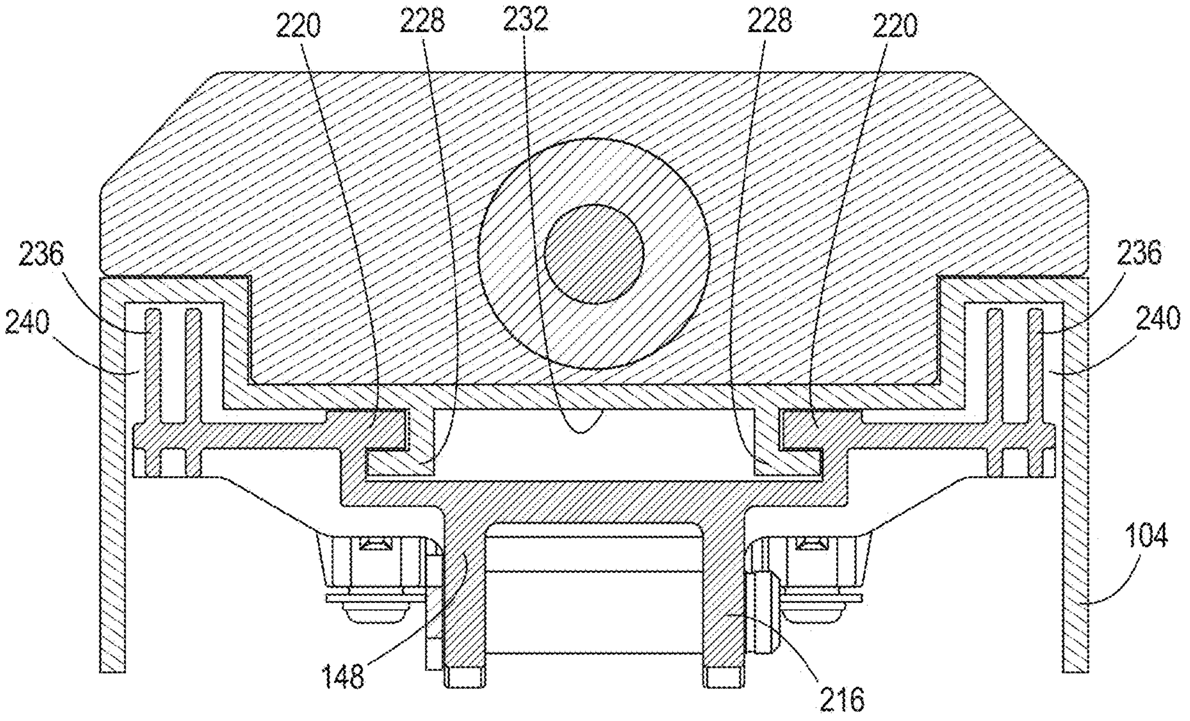
FIG. 9B is a cross-sectional view of the second sled assembled on the track of the support leg of FIG. 5.

With reference to FIG. 6, when the leg assembly 50 is assembled and positioned in the stowed state, the leg beam 112 extends generally parallel to the track 104. The first sled 144 is positioned at a top or upper end of the first range R1. The sled rails 220 engage the track rails 228, as illustrated in FIG. 9A. The second pin 156 extends through the aligned openings to rotatably couple the first beam end 120 to the first sled 144. The front end 172 of the lever arm 168 extends through the window 218 of the first sled 144 and is biased by the biasing member 196 to contact the rear surface 224 of the track 104. The pin 256 of the locking assembly 248 is biased toward the inner side of the track 104 and engages the leg beam 112. The pin 256 extends through an aperture 310 (FIG. 7) in the leg beam 112 to inhibit the leg beam 112 from sliding with respect to the track 104. The aperture 310 is spaced from the first beam end 120 of the leg beam 112 and specifically is spaced from the second pin 156 and pivot point 216 of the first sled 144 and thus the rotation axis of the leg beam 112. The locking assembly 248 thereby inhibits the leg beam 112 from rotating with respect to the track 104. The release actuator 200 is biased toward the second beam end 124 and the handle 80 is positioned in a lower portion of the opening 212 in the leg beam 112.

With continued reference to FIG. 5, the strut 116 is pivotally coupled between the leg beam 112 and the track 104. The first strut end 132 is rotatably coupled to the second sled 148 by the third pin 160. The second strut end 136 is rotatably coupled to the mounting point 140 on the leg beam 112 by the first pin 152. The sled rails 220 of the second sled 148 engage the track rails 228 to slidably couple the second sled 148 to the track 104. A spring 314 extends between the first sled 144 and the second sled 148 to bias (e.g., pull) the sleds 144, 148 toward each other. The first sled 144 is fixed in place by the locking assembly 248 and the second sled 148 is biased by the spring 314 to the top of the second range R2 with the stop projections 236 engaged with the stops 244 in the grooves 240. As best seen in FIG. 2, in the deployed position, the leg assembly 50, and specifically the foot 128 at the second beam end 124 of the leg beam 112, is spaced from the ground surface S.

To move the leg assembly 50 out of the stowed state, the knob 252 of the locking assembly 248 is pulled away from the track 104 and the pin 256 slides out of the aperture 310. The second sled 148 is inhibited from sliding toward the first sled 144 by the stop projections 236 and the stops 244. The first sled 144 is biased downward, toward the second sled 148 by the spring 314, such that upon release of the locking assembly, the first sled 144 quickly drops toward the second sled 148, the leg beam 112 pivots with respect to the first sled 144, and the strut 116 pivots with respect to the leg beam 112 and second sled 148. The spring 314 may be selected to have a biasing force strong enough to pull the first sled 144 to engage the second sled 148. In some embodiments, the biasing force is replaced by or assisted by gravity acting on the first sled 144 and on the leg beam 112 to pull the first sled 144 downward. The first sled 144 translates along the track 104 downward and contacts the second sled 148. The first sled 144 and the second sled 148 then slide together lowering the leg beam 112. As the first sled 144 travels along the track 104, the front end 172 of the lever arm 168 drags along the inner surface 232 of the track 104. Once the first sled 144 has traveled near the lower end of the first range R1, the front end 172 of the lever arm 168 aligns with the window 274 in the track 104. The biasing member 196 of the latching assembly 164 biases the lever arm 168 to pivot and the front end 172 and the engaging feature 180 to travel into the window 274. The upper surface 188 of the engaging feature 180 contacts a rim of the window 274 formed in the track 104 and inhibits the first sled 144 from sliding upward along the track 104, toward the stowed state. Additionally, in the illustrated embodiment including the adjustment mechanism 264, the lever arm 168 is biased into engagement with the threaded rod 270 positioned behind the window 274. The ribbed surface 184 contacts the threaded rod 270 so the inner threads on the ribbed surface 184 engage outer threads on the threaded rod 270. The inner threads match or complement the outer threads to facilitate engagement. The leg assembly 50 is thus positioned in the deployed state.

As best seen in FIG. 1, in the open configuration of the area light 10, each leg assembly 50, and specifically the foot 128 at the second end of each leg beam 112, is in contact with the ground surface S. In some environments the ground surface S beneath the area light 10 may be uneven. In these cases, one or more of the feet 128 of the leg assemblies 50 may not initially contact the ground surface S. To level the leg assemblies 50 and stabilize the area light 10, one or more of the leg assemblies 50 may be adjusted using the adjustment mechanism 264 while the leg assembly 50 is in the deployed state. Specifically, the leg assemblies 50 may be adjusted by moving the leg beam 112 with respect to the track 104 while the leg assembly 50 is deployed until the foot 128 engages the ground surface S. In some embodiments, each leg includes an adjustment mechanism 264. In these embodiments, each leg assembly 50 may include its own crank handle 282 for rotating the extension driver, or the area light 10 may include a single crank handle 282 that may be removably coupled to each leg assembly 50 in turn to rotate the extension driver. In some embodiments, only one of the leg assemblies 50 includes an adjustment mechanism 264 which is used to level the area light 10.

To operate each adjustment mechanism 264, the crank handle 282 is coupled to the extension driver 286. In the illustrated embodiment, the post 302 at the upper end 294 of the extension driver 286 extends out of the housing 38 of the base module 14. Once the crank handle 282 is coupled to the post 302, the crank handle 282 can be rotated about the axis of the extension driver 286 to transmit rotation to the extension driver 286. The extension driver 286 transmits the rotation through the lower end 298 to the threaded rod 270. Rotation of the threaded rod 270 engages the threads of the engaging feature 180 of the latching assembly 164. The threaded rod 270 is axially fixed to the track 104, therefore rotation of the threaded rod 270 is transmitted to the ribbed surface 184 of the lever arm 168 which translates the lever arm 168 along the threaded rod 270. The translation of the lever arm 168 is transmitted to the first sled 144 and the leg beam 112 through the second pin 156, and the second beam end 124 of the leg beam 112 lowers toward the ground surface S. The crank handle 282 may also be rotated in reverse to raise the second beam end 124 of the leg beam 112 away from the ground surface S. The operator rotates the crank handle 282 until the foot 128 at the second beam end 124 firmly engages the ground surface S. The process can be repeated with the other leg assemblies 50 as needed.

The area light 10 is moved to the open configuration, shown in FIG. 1, by deploying the leg assemblies 50, expanding the mast assembly 18, and positioning and illuminating the light assembly 22. Deploying the leg assemblies 50 may be the first step in opening the area light 10, and in some embodiments the mast assembly 18 may be prevented from extending until the leg assemblies 50 are deployed.

After use, the area light 10 is moved to the storage configuration by collapsing the mast assembly 18, folding the light assembly 22, and stowing the leg assemblies 50. To stow the leg assemblies 50, the operator engages the handle 208 of the release actuator 200 through the opening 212 in the leg beam 112 and slides the handle 208 toward the first beam end 120 of the leg beam 112 and into the upper portion of the opening 212. As seen in FIG. 5, movement of the handle 80 along the leg beam 112 moves the release cam surface 204 of the release actuator 200 into engagement with the lever cam surface 192 of the rear end 176 of the lever arm 168. The cam surfaces 192, 204 are shaped so that engagement of the surfaces pivots the front end 172 of the lever arm 168 away from the threaded rod 270, thereby disengaging the threaded rod 270, and out of the window 274 in the track 104, allowing the first sled 144 to translate upward along the track 104. The leg 108 can then be lifted by the operator, using the handle 208, toward the stowed position until the pin 256 from the locking assembly 248 is biased into engagement with the aperture 310 once again, locking the leg assembly 50 in the stowed state.

The leg assemblies 50 described herein offer increased stability and easy leveling, as well as easy storage. In the stowed position, the leg assemblies 50 are recessed into the base module 14 to decrease the footprint of the area light 10 for storage and to decrease the likelihood of damaging the leg assemblies 50 during transport.

With reference back to FIGS. 1 and 2, the light assembly 22 is coupled to the distal end 20 of the mast assembly 18 and includes a plurality of light heads 350 supported above the ground surface S to provide illumination to the surrounding area. As shown in FIGS. 11A-12B, in the illustrated embodiment, the light assembly 22 includes a hub 354, a first arm 358, a second arm 362, a first light head 366 coupled to the first arm 358, and a second light head 370 coupled to the second arm 362. In some embodiments, the light assembly 22 may include additional arms having additional light heads. In some embodiments, the light assembly 22 may include multiple light heads positioned on each arm.

Figure 11A:
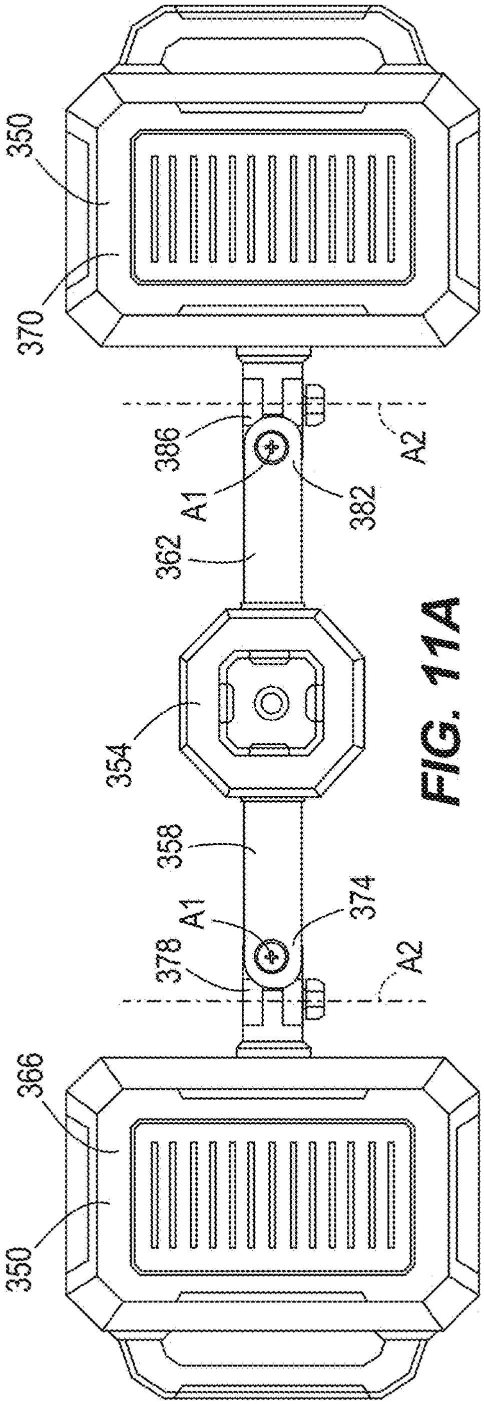
FIG. 11A is a top view of the light assembly of FIG. 1 with a pair of light heads in a first position.
Figure 11B:
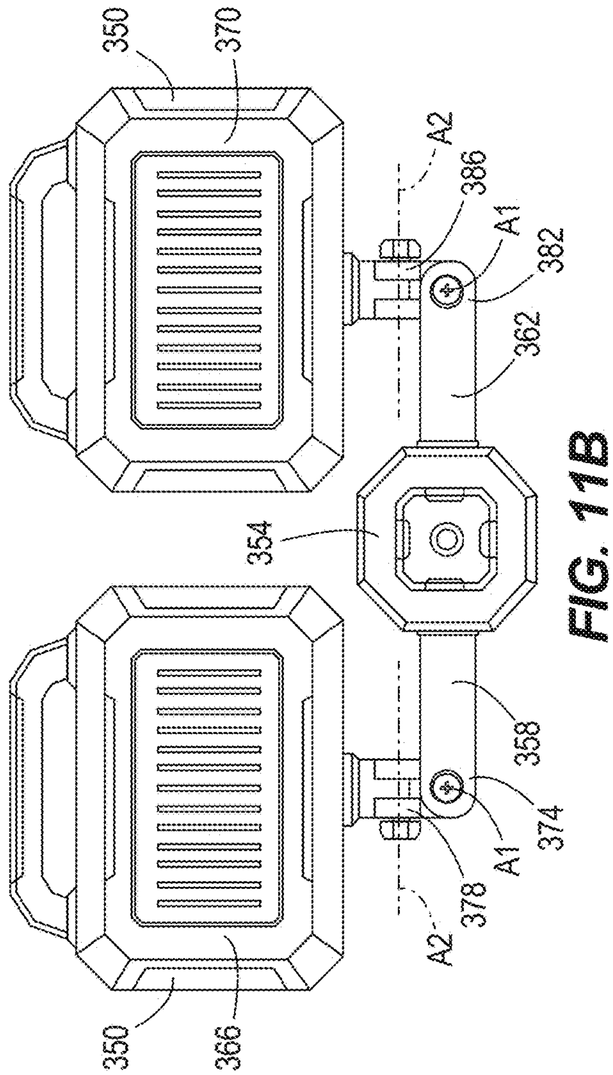
FIG. 11B is a top view of the light assembly of FIG. 1 with the light heads in a second position.
Figure 12B:
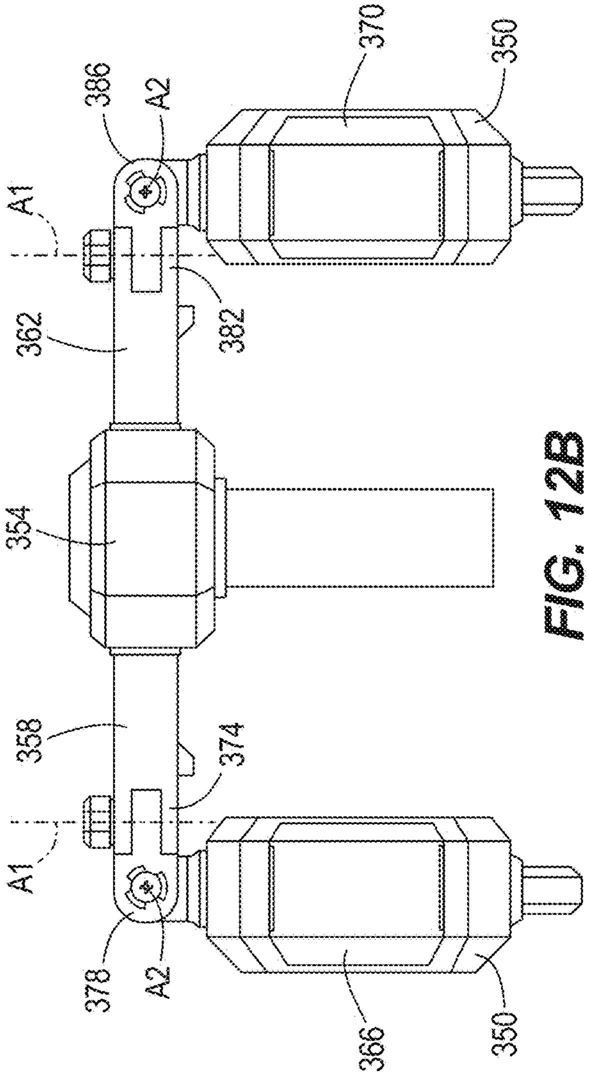
FIG. 12B is a side view of the light assembly of FIG. 1 with the light heads in an extended position.
Figure 12A:
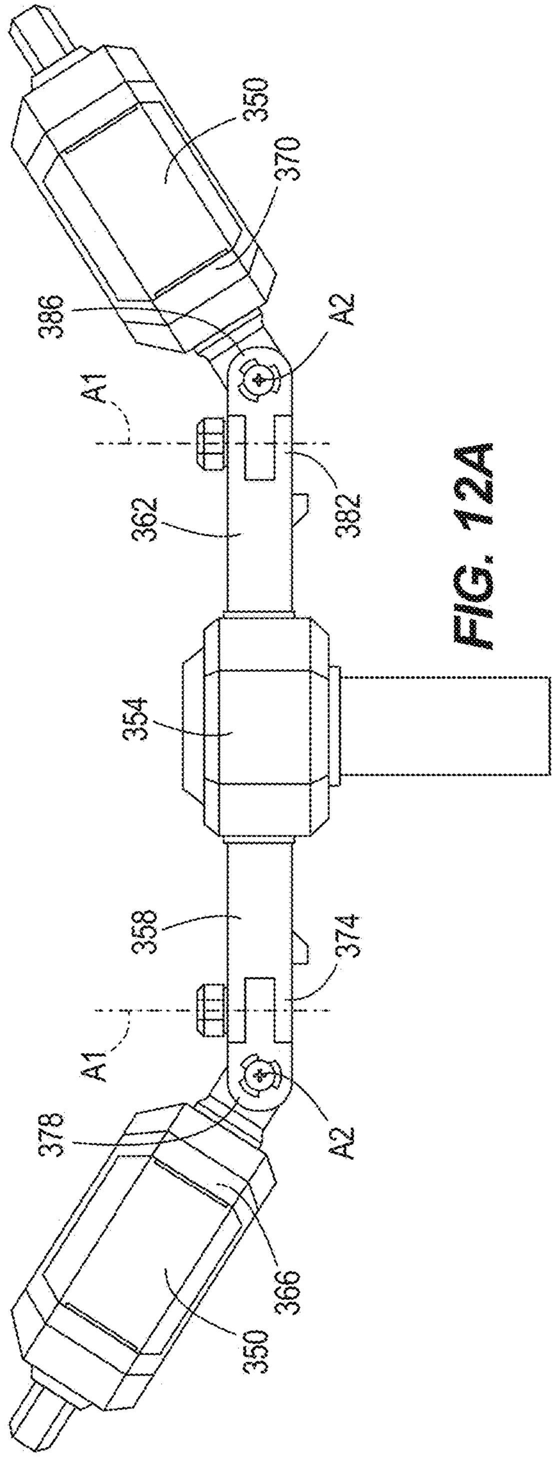
FIG. 12A is a side view of the light assembly of FIG. 1 with the light heads in a folded position.
Figure 13:
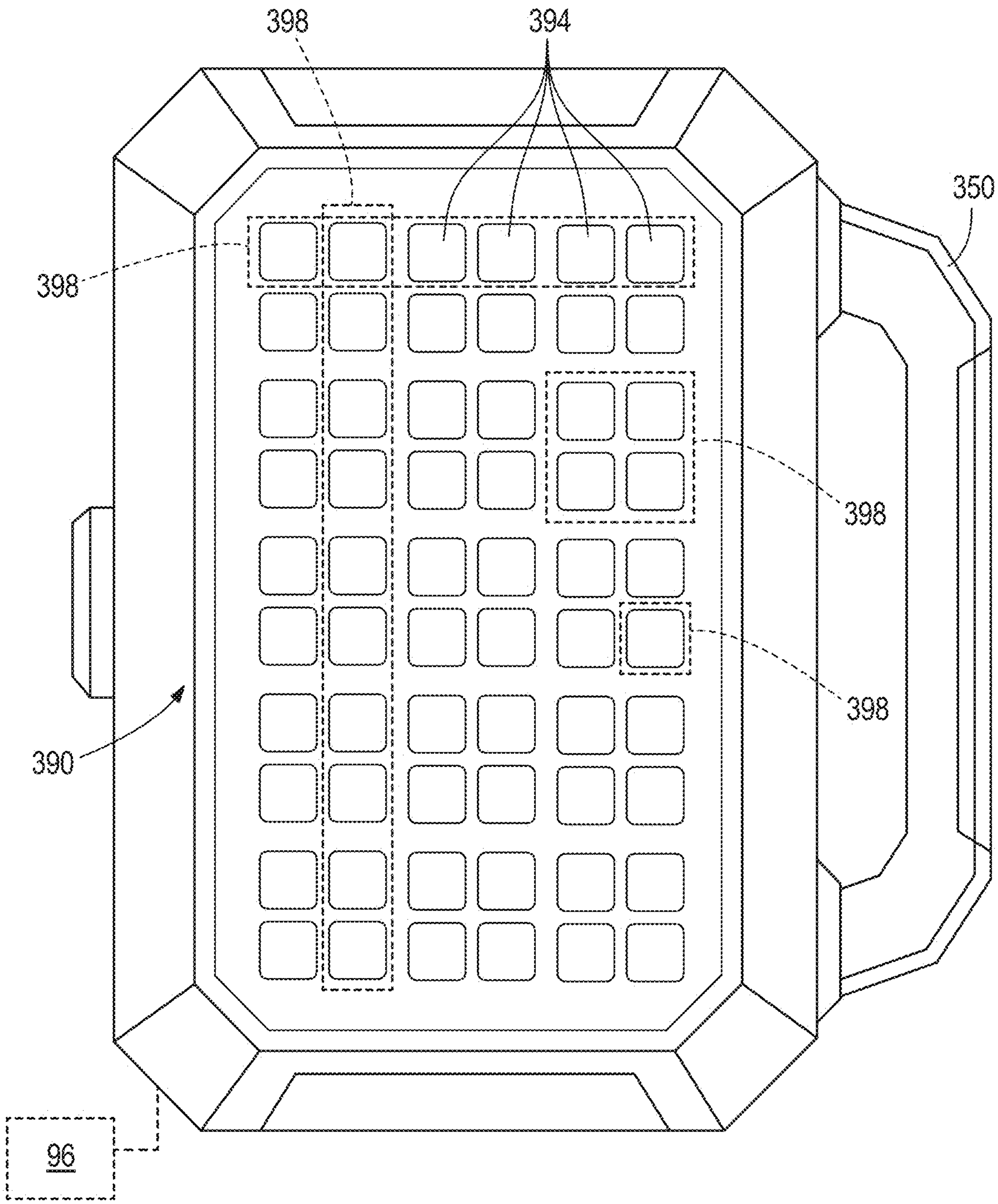
FIG. 13 is a plan view of one of the light heads of the light assembly of FIG. 1.

With continued reference to FIGS. 11A-12B, the light assembly 22 is adjustable to direct the light emitted from the light heads to illuminate the area. The first arm 358 extends out from the hub 354 generally horizontally to a first end 374. In some embodiments, the first arm 358 may instead extend at an angle upward or downward from horizontal. The first light head 366 is coupled to the first end 374 of the first arm 358 by a first connector 378. The first connector 378 is rotatably coupled to the first end 374 for rotation about a first axis A1, parallel to the mast assembly 18 and generally vertical. The first light head 366 is coupled to the first connector 378 for rotation about a second axis A2, perpendicular to the first axis A1 and the first arm 358. As seen in FIGS. 11A and 11B, in the illustrated embodiment, the first connector 378 is rotatable through 180 degree range about the first axis A1, centered in a positioned parallel to and colinear with the first arm 358. As seen in FIGS. 12A and 12B, in the illustrated embodiment, the first light head 366 is rotatable through a 120 degree range about the second axis A2, between a folded position, an aligned position, and an unfolded position. In the aligned position (FIG. 1), the first light head 366 is aligned with the first arm 358 and light is emitted generally downward, to illuminate the base module 14 and the immediate surroundings thereof. In the folded position, the first light head 366 is rotated approximately 90 degrees toward the mast assembly 18 and extends down from the first arm 358, generally parallel to the mast assembly 18. The folded position is typically used when the area light 10 is in the storage configuration thus the lights are not typically operated, however, would emit light generally horizontally and inwardly toward the mast assembly 18. In the unfolded position the first light head 366 is rotated approximately 30 degrees upward, away from the base module 14 and emits light generally down and out to illuminate a wider area surrounding the base module 14. In other embodiments, the ranges of motion may be smaller or larger than those described, and/or may be otherwise positioned relative to the first arm 358.

In the illustrated embodiment the second arm 362 extends from the hub 354 to a second end 382 directly opposite the first arm 358 and the second arm 362 is aligned (i.e., coaxial) with the first arm. The second light head 370 is supported on the second end 382 of the second arm 362 by a second connector 386 which is substantially the same as the first connector 378. The first light head 366 and the second light head 370 are independently positioned and can be moved to create customized illumination profiles, including dispersed or focused illumination profiles (e.g., to light wide or narrow areas).

In the illustrated embodiment, the light heads 350 are identical. In other embodiments, the light heads 350 may be mirror images of each other or may be substantially different. One of the light heads 350 is illustrated in more detail in FIG. 13. The light head 350 includes a light source 390 configured to emit light. In the illustrated embodiment, the light source 390 includes an array of light sources 394, and specifically an array of light emitting diodes (LEDs) 394. In some embodiments, the array of LEDs 394 is positioned on a circuit board (not shown). The LEDs 394 are separated into a plurality of groups 398 that are individually controllable. In the illustrated embodiment, the LEDs 394 are arranged in a grid-like pattern, however, other arrangements may be used as well. The groups may include rows of LEDs 394, columns of LEDS 394, clusters of adjacent LEDs 394, or individual LEDs 394. In some embodiments, the LEDs 394 are dimmable and emit light at different intensities. The light source 390 can be operated in a plurality of modes and each mode may illuminate a different combination of LEDs 394 at different intensities to create a desired illumination scope.

The light assembly 22 is coupled to the controller 96 of the area light 10 to selectively connect the LEDs 394 to the power source 42 (e.g., the batteries 64). In the illustrated embodiment, the controller 96 controls the light assembly 22, the mast drive mechanism 34, and the drive motor 84. In other embodiments, the light assembly 22 may include a separate controller disposed in the base module 14, the light assembly 22, or the light heads 350. In the illustrated embodiment, the controller 96 is coupled to the user interface 88. The user interface 88 allows an operator to select one of the plurality of modes based on the desired illumination scope and the controller operates the groups 398 of LEDs 394 based on the input. The operator may provide a first input to the user interface 88 selecting a first mode with a first illumination scope. In one example, the first mode is a narrow beam mode. In response, the controller 96 may operate a first group 398 of the array of LEDs 394 to create the first illumination scope. Similarly, the operator may provide a second input to the user interface 88 selecting a second mode with a second illumination scope. In one example, the second mode is a wide beam mode. In response, the controller 96 may operate a second group 398 of the array of LEDs 394 to create the second illumination scope. Thus, the lighting assembly 22 of the area light 10 provides customizable and positionable lighting to illuminate an area surrounding the area light 10.

The embodiment described above and illustrated in the figures are presented by way of example only and are not intended as a limitation upon the concepts and principles of the present invention. As such, it will be appreciated that various changes in the elements and their configuration and arrangement are possible without departing from the spirit and scope of the present invention. Various features and advantages of the invention are set forth in the following claims.

What is claimed is:

1. An area light comprising:

a base module;

a mast assembly extending upward from the base module;

a light assembly coupled to the mast assembly and configured to emit light; and a leg assembly coupled to the base module for movement between a stowed position and a deployed position, the leg assembly including a track coupled to the base module, a leg beam extending between a first beam end and a second beam end, the first beam end being mounted to the track for translation along the track and rotation with respect to the track, and an adjustment mechanism for translating the leg beam with respect to the track after the leg assembly is in the deployed position;

wherein the leg assembly also includes a strut extending between a first strut end, slidably and pivotally coupled to the track, and a second strut end, pivotally coupled to the leg beam between the first beam end and the second beam end.

2. The area light of claim 1, wherein, in the deployed position, the leg beam is inhibited from sliding along the track by a latching assembly, wherein the latching assembly includes a lever arm pivotally coupled to the leg beam and configured to engage the track to inhibit translation of the leg beam, and a spring configured to bias the lever arm into engagement with the track.

3. The area light of claim 2, wherein the lever arm includes a first ribbed surface and the track includes a second ribbed surface, and wherein the spring is configured to bias the lever arm to move the first ribbed surface into engagement the second ribbed surface to inhibit translation of the leg beam with respect to the track.

4. The area light of claim 3, wherein the second ribbed surface includes outer threads, and wherein the first ribbed surface includes inner threads matching the outer threads.

5. The area light of claim 4, wherein the adjustment mechanism includes a handle configured to rotate the second ribbed surface, and wherein engagement of the outer threads and the inner threads translates the leg beam with respect to the track.

6. The area light of claim 2, wherein the latching assembly also includes a release actuator coupled to the leg beam, wherein the release actuator includes a handle having a cam surface, and wherein the release actuator is configured to slide along the leg beam to engage the cam surface with the lever arm to rotate the lever arm relative to the leg beam and disengage the lever arm from the track.

7. The area light of claim 6, wherein the handle is accessible through an opening in the leg beam.

8. The area light of claim 1, wherein the base module includes a housing that is generally cuboid, wherein the leg assembly is one of a plurality of leg assemblies, and wherein the track of each leg assembly is coupled to an edge of the housing.

9. An area light comprising:

a base module;

a mast assembly extending upward from the base module;

a light assembly coupled to the mast assembly and configured to emit light; and a leg assembly coupled to the base module and movable between a retracted state and a deployed state, the leg assembly including a track coupled to the base module, a leg beam extending between a first beam end and a second beam end, the first beam end adjacent the track, the second beam end configured to engage a ground surface, a strut extending between a first strut end and a second strut end, the first strut end adjacent the track, the second strut end pivotally coupled to the leg beam, a first sled slidably mounted between the leg beam and the track to slide along the track within a first range, and a second sled is slidably mounted between the strut and the track to slide along the track within a second range.

10. The area light of claim 9, wherein the first beam end of the leg beam is pivotally coupled to the first sled, and wherein the first strut end of the strut is pivotally coupled to the second sled.

11. The area light of claim 9, wherein the first sled is biased toward the second sled by a spring.

12. The area light of claim 11, wherein the leg assembly is selectively retained in the retracted state by a locking assembly, and wherein upon release of the locking assembly, the first sled moves toward the second sled, causing the leg assembly to move toward the deployed state.

13. An area light comprising:

a base module having a set of wheels supporting the base module on a surface;

a battery receptacle disposed in the base module, the battery receptacle configured to receive a battery;

a drive motor supported by the base module and electrically coupled to the battery receptacle, the drive motor configured to receive power from the battery and rotate at least some of the set of wheels;

a mast assembly extending from the base module;

a light assembly coupled to the mast assembly and electrically coupled to the battery receptacle, the light assembly configured to receive power from the battery; and a leg assembly coupled to the base module for movement between a stowed position and a deployed position, the leg assembly including a track coupled to the base module, a leg beam extending between a first beam end and a second beam end, the first beam end being mounted to the track for translation along the track and rotation with respect to the track, and an adjustment mechanism for translating the leg beam with respect to the track after the leg assembly is in the deployed position;

wherein the leg assembly also includes a strut extending between a first strut end, slidably and pivotally coupled to the track, and a second strut end, pivotally coupled to the leg beam between the first beam end and the second beam end.

14. The area light of claim 13, wherein the set of wheels includes a pair of drive wheels operably coupled to the drive motor and a pair of non-powered caster wheels.

15. The area light of claim 13, wherein the base module includes a front wall, a rear wall opposite the front wall, and a handle extending from the rear wall and configured to be pushed by a user to roll the set of wheels across the surface.

16. The area light of claim 15, wherein the set of wheels includes a pair of drive wheels adjacent the rear wall and a pair of non-powered wheels adjacent the front wall.

17. The area light of claim 15, wherein the battery receptacle is accessible through an opening in the rear wall of the base module.

18. The area light of claim 13, wherein the light assembly includes an array of light sources, and wherein the area light further comprises:

a user interface supported by the base module; and a controller configured to selectively operate the array of light sources based on an input from the user interface.

19. The area light of claim 18, wherein in response to the controller receiving a first input from the user interface corresponding to a first illumination scope, the controller operates a first group of the array of light sources, and wherein in response to the controller receiving a second input from the user interface corresponding to a second illumination scope, the controller operates a second group of the array of light sources that is different than the first group of the array of light sources.

* * * * *